United States Patent
Ren et al.

(10) Patent No.: US 11,184,208 B2
(45) Date of Patent: Nov. 23, 2021

(54) COMMUNICATION METHOD, COMMUNICATIONS APPARATUS, AND SYSTEM

(71) Applicant: HUAWEI TECHNOLOGIES CO., LTD., Shenzhen (CN)

(72) Inventors: Haibao Ren, Shanghai (CN); Huiying Zhu, Shanghai (CN); Yuanjie Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/991,590

(22) Filed: Aug. 12, 2020

(65) Prior Publication Data
US 2020/0374175 A1 Nov. 26, 2020

Related U.S. Application Data

(63) Continuation of application No. PCT/CN2018/076904, filed on Feb. 14, 2018.

(51) Int. Cl.
*H04K 1/10* (2006.01)
*H04L 27/28* (2006.01)
(Continued)

(52) U.S. Cl.
CPC ....... *H04L 27/2628* (2013.01); *H04B 7/0634* (2013.01); *H04B 17/309* (2015.01); *H04L 1/06* (2013.01); *H04L 27/265* (2013.01)

(58) Field of Classification Search
CPC ..... H04L 27/2628; H04L 27/265; H04L 1/06; H04B 17/309; H04B 7/0634; H04B 7/0613
(Continued)

(56) References Cited

U.S. PATENT DOCUMENTS 9,806,774 B2 10/2017 Lau et al.
2016/0211895 A1* 7/2016 Onggosanusi ....... H04B 7/0613
2017/0302353 A1 10/2017 Rahman et al.

FOREIGN PATENT DOCUMENTS

CN 101227217 A 7/2008
CN 102201899 A 9/2011
(Continued)

OTHER PUBLICATIONS

Huawei, HiSilicon, Design for Type II Feedback. 3GPP TSG RAN WG1 Meeting #88bis, Spokane, USA, Apr. 3-7, 2017, R1-1705076, 11 pages.
(Continued)

*Primary Examiner* — Phuong Phu
(74) *Attorney, Agent, or Firm* — Stein IP, LLC

(57) ABSTRACT

A communication method, including: receiving a reference signal, where the reference signal is used for channel measurement; sending CSI, where the CSI is used to indicate one or more measured values, and the measured values are used to determine a precoding matrix, or the measured values are a precoding matrix. The measured value is related to a first group of base vectors and a second group of base vectors, or the measured value is related to a Kronecker product of the first group of base vectors and the second group of base vectors; the first group of base vectors includes an inverse discrete Fourier transform OFT vector or a Kronecker product of two IDFT vectors, and the second group of base vectors include a discrete Fourier transform DFT vector.

20 Claims, 3 Drawing Sheets

(51) Int. Cl.
  *H04L 27/26*  (2006.01)
  *H04B 17/309*  (2015.01)
  *H04B 7/06*  (2006.01)
  *H04L 1/06*  (2006.01)

(58) Field of Classification Search
  USPC ............... 375/260, 346, 219, 220, 295, 316
  See application file for complete search history.

(56) References Cited

FOREIGN PATENT DOCUMENTS

| | | |
|---|---|---|
| CN | 102938688 A | 2/2013 |
| CN | 103716078 A | 4/2014 |
| CN | 103782533 A | 5/2014 |
| CN | 105210405 A | 12/2015 |
| CN | 106131026 A | 11/2016 |
| CN | 107431515 A | 12/2017 |

OTHER PUBLICATIONS

Samsung, Remaining details of Type I and Type II CSI codebooks. 3GPP TSG RAN WG1 Meeting #90, Prague, P. R. Czechia, 21th Aug. 25, 2017, R1-1713590, 10 pages.

\* cited by examiner

COMMUNICATION METHOD, COMMUNICATIONS APPARATUS, AND SYSTEM

CROSS-REFERENCE TO RELATED APPLICATIONS

This application is a continuation of International Application No. PCT/CN2018/076904, filed on Feb. 14, 2018, the disclosure of which is hereby incorporated by reference in its entirety.

TECHNICAL FIELD

Aspects of this application relates to the field of wireless communications, and more specifically, to a communication method, a communications apparatus, and a system.

BACKGROUND

In a massive multiple-input multiple-output (Massive MIMO) technology, interference between a plurality of users and interference between a plurality of signal flows of a single user may be reduced through precoding. This helps improve signal quality, implement spatial multiplexing, and improve spectrum utilization.

Currently, a method for determining a precoding matrix is already known. A receive end device feeds back channel state information (CSI) based on a received reference signal, and a transmit end device may determine a precoding matrix based on two levels of feedback from the receive end device. In a first-level feedback, the receive end device may determine one or more superior beam vectors by traversing a plurality of orthogonal beam vectors in a first-level codebook. In the first-level feedback, the receive end device may select one or more same beam vectors in all subbands. In other words, the first-level feedback may be wideband feedback. In a second-level feedback, the receive end device may independently feed back amplitudes and phases in the subbands. The receive end device may determine the amplitudes and the phases by traversing amplitudes and phases in a second-level codebook in the subbands. In other words, amplitudes and phases selected in different subbands may be different. Therefore, the second-level feedback may be subband feedback.

However, with development of the massive MIMO technology, a quantity of antenna ports are expected to increase. As the quantity of antenna ports increases, the method for determining a precoding matrix becomes more complex. This poses a challenge to the receive end device, especially a terminal device in downlink transmission.

SUMMARY

In this application, the term "and/or" describes an association relationship between associated objects and indicates that three relationships may exist. For example, A and/or B may indicate the following three cases: Only A exists, both A and B exist, and only B exists. The character "/" usually indicates an "or" relationship between the associated objects.

The phrases " . . . one or more of the following . . . " and " . . . at least one of" means "one" or "more". "At least one of A or B" or "One or more of the following: A or B", similar to "A and/or B", describes an association relationship between associated objects and represents that three relationships may exist. For example, "at least one of A or B" and "one or more of A or B" may represent the following three cases: only A exists, both A and B exist, and only B exists.

Aspects of this application provide a communication method, a communications apparatus, and a system, to reduce complexity of measurement by a receive end device.

According to a first aspect, a communication method is provided. The method includes:

receiving a reference signal, where the reference signal is used for channel measurement; and sending channel state information CSI, where the CSI is used to indicate a measured value set, the measured value set is used to determine a precoding matrix, or the measured value set is the precoding matrix, and the measured value set includes one or more measured values, where the measured value is related to a first group of base vectors and a second group of base vectors, or the measured value is related to a Kronecker product of the first group of base vectors and the second group of base vectors; the first group of base vectors includes an inverse discrete Fourier transform (IDFT) vector or a Kronecker product of two IDFT vectors, and the second group of base vectors include a discrete Fourier transform (DFT) vector.

It should be understood that the measured value set may include one or more measured values, and each measured value corresponds to one antenna port group. Therefore, a quantity of measured values included in the measured value set may be equal to the quantity of antenna port groups.

In this embodiment of this application, the measured value includes R columns, and a dimension of each column is $(N_T \cdot N_{SB}) \times 1$; or the measured value includes R matrices, and a dimension of each matrix is $N_T \times N_{SB} \cdot N_T$ is a quantity of antennas in an antenna port group, $N_{SB}$ is a quantity of frequency domain units for transmitting the reference signal, and R is determined based on a quantity of antennas for receiving the reference signal or a rank of a channel matrix, where $p \geq 1$, $N_T \geq 1$, $N_{SB} \geq 1$, $R \geq 1$, and $N_T$, $N_{SB}$, and R are all positive integers.

In a possible implementation, the measured value is related to a first group of base vectors and a second group of base vectors, or the measured value is related to a Kronecker product of the first group of base vectors and the second group of base vectors may be implemented by processing the channel matrix by using the measured value set based on the first group of base vectors and the second group of base vectors, or may be implemented by processing the precoding matrix based on the first group of base vectors and the second group of base vectors. This is equivalent to that, a channel matrix or a precoding matrix obtained after mathematical transformation is sent to a network device by using the CSI. Therefore, the network device may determine the precoding matrix based on the measured value set indicated by the received CSI.

According to the foregoing technical solution, a terminal device may process the channel matrix or the precoding matrix based on the first group of base vectors and the second group of base vectors, and feed back a processed result to the network device by using the CSI. The network device may determine the measured value based on the CSI, to further determine the precoding matrix. The terminal device may obtain the to-be-fed-back CSI through fast computation of the FFT and the IFFT. However, in a prior-art process, a terminal device traverses all codewords in a codebook to determine a precoding matrix. Therefore, complexity of calculation by the terminal device may be significantly reduced. This helps reduce power consumption of the terminal device. In addition, the CSI is fed back, so that the network device determines the proper precoding matrix to precode a to-be-sent signal. This improves data transmission reliability. In other words, the data transmission reliability is ensured, channel measurement complexity is significantly reduced, and power consumption is reduced. Therefore, this helps improve performance of an entire communications system.

With reference to the first aspect, in some implementations of the first aspect, the method further includes:

receiving configuration information of one or more of the following:

the first group of base vectors, the second group of base vectors, or the Kronecker product of the first group of base vectors and the second group of base vectors.

In other words, the network device may configure the first group of base vectors, the second group of base vectors, or the Kronecker product of the two groups of base vectors for the terminal device.

With reference to the first aspect, in some implementations of the first aspect, the method further includes:

sending configuration information of one or more of the following:

the first group of base vectors, the second group of base vectors, or the Kronecker product of the first group of base vectors and the second group of base vectors.

In other words, the terminal device may feed back the first group of base vectors, the second group of base vectors, or the Kronecker product of the two groups of base vectors to the network device.

According to a second aspect, a communication method is provided. The method includes:

sending a reference signal, where the reference signal is used for channel measurement;

receiving channel state information CSI, where the CSI is used to indicate a measured value set, the measured value set is used to determine a precoding matrix, or the measured value set is the precoding matrix, and the measured value set includes one or more measured values; the measured value is related to a first group of base vectors and a second group of base vectors, or the measured value is related to a Kronecker product of the first group of base vectors and the second group of base vectors, the first group of base vectors includes an inverse discrete Fourier transform IDFT vector or a Kronecker product of two IDFT vectors, and the second group of base vectors include a discrete Fourier transform DFT vector; and precoding a signal based on the precoding matrix determined based on the measured value set, and sending a precoded signal.

It should be understood that the measured value set may include one or more measured values, and each measured value corresponds to one antenna port group. Therefore, a quantity of measured values included in the measured value set may be a quantity of antenna port groups.

In this embodiment of this application, the measured value includes R columns, and a dimension of each column is $(N_T \cdot N_{SB}) \times 1$; or the measured value includes R columns, and a dimension of each column is $N_T \times 1$, where $N_T$ is a quantity of antennas in an antenna port group, $N_{SB}$ is a quantity of frequency domain units for transmitting the reference signal, and R is determined based on a quantity of antennas for receiving the reference signal or a rank of a channel matrix, where $p \geq 1$, $N_T \geq 1$, $N_{SB} \geq 1$, $R \geq 1$, and $N_T$, $N_{SB}$, and R are all positive integers.

In a possible implementation, that the measured value is related to a first group of base vectors and a second group of base vectors, or the measured value is related to a Kronecker product of the first group of base vectors and the second group of base vectors may be implemented by processing the channel matrix based on the first group of base vectors and the second group of base vectors, or may be implemented by processing the precoding matrix based on the first group of base vectors and the second group of base vectors. This is equivalent to that, a channel matrix or a precoding matrix obtained after mathematical transformation is sent to a network device by using the CSI. Therefore, the network device may determine the precoding matrix based on the measured values indicated by the received CSI.

According to the foregoing technical solution, a terminal device may process the channel matrix or the precoding matrix based on the first group of base vectors and the second group of base vectors, and feed back a processed result to the network device by using the CSI. The network device may determine the measured value based on the CSI, to further determine the precoding matrix. The terminal device may obtain the to-be-fed-back CSI through fast computation of the FFT and the IFFT. However, in a prior-art process, a terminal device traverses all codewords in a codebook to determine a precoding matrix. Therefore, complexity of calculation by the terminal device may be significantly reduced. This helps reduce power consumption of the terminal device. In addition, the CSI is fed back, so that the network device determines the proper precoding matrix to precode a to-be-sent signal. This improves data transmission reliability. In other words, the data transmission reliability is ensured, channel measurement complexity is significantly reduced, and power consumption is reduced. Therefore, this helps improve performance of an entire communications system.

With reference to the second aspect, in some implementations of the second aspect, the method further includes:

sending configuration information of one or more of the following:

the first group of base vectors, the second group of base vectors, or the Kronecker product of the first group of base vectors and the second group of base vectors.

In other words, the network device may configure the first group of base vectors, the second group of base vectors, or the Kronecker product of the two groups of base vectors for the terminal device.

With reference to the second aspect, in some implementations of the second aspect, the method further includes:

receiving configuration information of one or more of the following:

the first group of base vectors, the second group of base vectors, or the Kronecker product of the first group of base vectors and the second group of base vectors.

In other words, the terminal device may feed back the first group of base vectors, the second group of base vectors, or the Kronecker product of the two groups of base vectors to the network device.

With reference to the first aspect or the second aspect, in some possible implementations, the first group of base vectors is defined in a protocol; or the second group of base vectors is defined in a protocol; or the first group of base vectors and the second group of base vectors are defined in a protocol; or the Kronecker product of the first group of base vectors and the second group of base vectors is defined in a protocol.

In other words, the first group of base vectors, the second group of base vectors, or the Kronecker product of the two groups of base vectors may alternatively be defined in the protocol.

It should be understood that a specific method for obtaining, by the terminal device, the first group of base vectors, the second group of base vectors, or the Kronecker product of the two groups of base vectors is not limited in this application. For example, the first group of base vectors, the second group of base vectors, or the Kronecker product of the two groups of base vectors may be fed back by the terminal device, or pre-defined by the network device, for example, defined in a protocol.

With reference to the first aspect or the second aspect, in some possible implementations, the measured value includes R columns, and an $n^{th}$ column $y^n$ in the R columns meets:

$$y^n = \alpha \sum_{i=1}^{M} B_i^n P_i^n C_i^n,$$

where $\alpha$ is a normalized coefficient; M is a quantity of base vectors, and the M base vectors are M columns in the Kronecker product of the first group of base vectors and the second group of base vectors; $B_i^n$ is an $i^{th}$ column vector in the M base vectors, and a dimension of $B_i^n$ is $N_T \cdot N_{SB} \times 1$; $P_i^n C_i^n$ is a linear superposition coefficient of $B_i^n$; $P_i^n$ is an amplitude coefficient of $B_i^n$ $C_i^n$ is a phase coefficient of $B_i^n$; $N_T$ is a quantity of transmit antenna ports of the reference signal, $N_{SB}$ is a quantity of frequency domain units included in a frequency domain resource for transmitting the reference signal, and R is determined based on a quantity of receive antenna ports of the reference signal or a rank of a channel matrix, where $1 \leq i \leq M$, $1 \leq R$, and i, M, and R are all integers.

It should be understood that the $n^{th}$ column vector may be any one of the R column vectors. In an understanding, the $n^{th}$ column vector of the R column vectors meets the foregoing formula (condition), namely, $$y^n = \alpha \sum_{i=1}^{M} B_i^n P_i^n C_i^n.$$

A dimension of each column in the measured value is described based on an antenna port group. M base vectors in each column vector, M amplitude coefficients corresponding to the M base vectors, and M phase coefficients corresponding to the M base vectors may be indicated by using CSI. To be specific, the CSI may include R groups of indication information, and each group of indication information indicates one or more of the following: the M base vectors, the M amplitude coefficients corresponding to the M base vectors, or the M phase coefficients corresponding to the M base vectors.

In the embodiments of this application, the R groups of indication information that correspond to the R columns may be fed back independent of each other or may be fed back in a different manner. For example, when the M base vectors, the M amplitude coefficients corresponding to the M base vectors, and the M phase coefficients corresponding to the M base vectors are all fed back by the terminal device, one of the R columns may be indicated by using the M base vectors, M absolute amplitudes, and M absolute phases, and remaining (R−1) columns may be indicated by using the M base vectors, M relative amplitudes, and M relative phases. This is not limited in the embodiments of this application.

With reference to the first aspect or the second aspect, in some possible implementations, the CSI includes one or more of the following:

indication information of M base vectors corresponding to an $r^{th}$ column of the R columns, indication information of M amplitude coefficients corresponding to the M base vectors, or indication information of M phase coefficients corresponding to the M base vectors; or the CSI is used to indicate one or more of the following:

M base vectors corresponding to an $r^{th}$ column of the R columns, M amplitude coefficients corresponding to the M base vectors, or M phase coefficients corresponding to the M base vectors, where a value of r is traversed in [1, R], and r is an integer.

The M base vectors corresponding to the $r^{th}$ column of the R columns, the M amplitude coefficients corresponding to the M base vectors, or the M phase coefficients corresponding to the M base vectors, indicated by the CSI, are substituted into $$y^n = \alpha \sum_{i=1}^{M} B_i^n P_i^n C_i^n,$$

to obtain the $r^{th}$ column in the measured value. The column vector is converted into an $N_T \times N_{SB}$-dimensional matrix, to obtain a precoding matrix corresponding to an $r^{th}$ receive antenna or an $r^{th}$ layer.

It should be understood that, for all the R columns in the measured value, one or more of the foregoing listed items may be used to construct a column vector. The value of r is traversed in [1, R], so that an $N_T \times (N_{SB} \cdot R)$-dimensional precoding matrix may be obtained.

With reference to the first aspect or the second aspect, in some possible implementations, the indication information of the M base vectors corresponding to the $r^{th}$ column includes a position, in a preconfigured matrix, of each of the M base vectors corresponding to the $r^{th}$ column, and the preconfigured matrix is the Kronecker product of the first group of base vectors and the second group of base vectors.

In other words, the M base vectors corresponding to the $r^{th}$ column may be indicated by using the positions of the M base vectors in the Kronecker product (namely, the preconfigured matrix) of the first group of base vectors and the second group of base vectors. The M column vectors determined based on the preconfigured matrix are M base vectors $B_i^n$ used to construct the measured value.

With reference to the first aspect or the second aspect, in some possible implementations, the indication information of the M base vectors corresponding to the $r^{th}$ column includes a position, in the first group of base vectors, of each of the M column vectors corresponding to the $r^{th}$ column, and a position of the column vector in the second group of base vectors.

In other words, the M base vectors corresponding to the $r^{th}$ column may be indicated by using the positions of the M base vectors in the first group of base vectors and the positions of the M base vectors in the second group of base vectors. A Kronecker product of a column vector determined based on the first group of base vectors and a column vector determined based on the second group of base vectors may be used to obtain a base vector for constructing the measured value.

With reference to the first aspect or the second aspect, in some possible implementations, a value of M is indicated by the network device, or is defined in a protocol.

With reference to the first aspect or the second aspect, in some possible implementations, the measured value includes R matrices, and an $n^{th}$ matrix $Y^n$ of the R matrices meets:

$$Y^n = \beta \sum_{b=1}^{M_B} \sum_{t=1}^{M_T} E_b^n (F_t^n)^T P_{b,t}^n C_{b,t}^n,$$

where $\beta$ is a normalized coefficient; $M_B$ is a quantity of first base vectors, $M_T$ is a quantity of second base vectors, the $M_B$ first base vectors are $M_B$ columns in the first group of base vectors, and the $M_T$ second base vectors are $M_T$ columns in the second group of base vectors; $E_b^n$ is a $b^{th}$ first base vector in the $M_B$ first base vectors corresponding to the $n^{th}$ matrix, and a dimension of $E_b^n$ is $N_T \times 1$; F is a $t^{th}$ second base vector in the $M_T$ second base vectors corresponding to the $n^{th}$ matrix, and a dimension of $F_i^n$ is $N_{SB} \times 1$; $P_{b,t}^n C_{b,t}^n$ is a linear superposition coefficient; $P_{b,t}^n$ is an amplitude coefficient; $C_{b,t}^n$ is a phase coefficient.

It should be understood that the $n^{th}$ matrix may be any one of the R matrices. In an understanding, the $n^{th}$ matrix of the R matrices meets the foregoing formula (condition), namely, $$Y^n = \beta \sum_{b=1}^{M_B} \sum_{t=1}^{M_T} E_b^n (F_t^n)^T P_{b,t}^n C_{b,t}^n.$$

Because a measured value is described based on an antenna port, a dimension of each matrix Y may be $N_T \times N_{SB}$. $M_B$ first base vectors, $M_T$ second base vectors, $M_B \cdot M_T$ amplitude coefficients, and $M_B \cdot M_T$ phase coefficients in each matrix may be indicated by using the CSI. To be specific, the CSI may include R groups of indication information, and each group of indication information indicates one or more of the following: the $M_B$ first base vectors, the $M_T$ second base vectors, the $M_B \cdot M_T$ amplitude coefficients, or the $M_B \cdot M_T$ phase coefficients.

In the embodiments of this application, the R groups of indication information that correspond to the R matrices may be fed back independent of each other or may be fed back in a different manner.

With reference to the first aspect or the second aspect, in some possible implementations, the CSI includes one or more of the following:

indication information of the $M_B$ first column vectors corresponding to the $r^{th}$ matrix of the R matrices, indication information of the $M_T$ second column vectors corresponding to the $r^{th}$ matrix, indication information of the $M_B \cdot M_T$ amplitude coefficients corresponding to the $M_B$ first column vectors and the $M_T$ second column vectors, or indication information of the $M_B \cdot M_T$ phase coefficients corresponding to the $M_B$ first column vectors and the $M_T$ second column vectors, where the indication information of the $M_B$ first column vectors includes a position, in the first group of column vectors, of each of the $M_B$ first column vectors, and the indication information of the $M_T$ second column vectors includes a position, in the second group of column vectors, of each of the $M_T$ second column vectors.

With reference to the first aspect or the second aspect, a value of $M_B$ is indicated by the network device, or is defined in a protocol; and a value of $M_T$ is indicated by the network device, or is defined in the protocol.

According to a third aspect, a terminal device is provided. The terminal device has functions of implementing the terminal device in the method designs of the first aspect. The functions may be implemented by hardware, or may be implemented by hardware executing corresponding software. The hardware or the software includes one or more units corresponding to the foregoing functions.

According to a fourth aspect, a network device is provided. The network device has functions of implementing the network device in the method designs of the second aspect. The functions may be implemented by hardware, or may be implemented by hardware executing corresponding software. The hardware or the software includes one or more units corresponding to the foregoing functions.

According to a fifth aspect, a terminal device is provided. The terminal device includes a transceiver, a processor, and a memory. The processor is configured to control the transceiver to send and receive a signal. The memory is configured to store a computer program. The processor is configured to invoke the computer program from the memory and run the computer program, to enable the terminal device to perform the method according to any one of the first aspect or the possible implementations of the first aspect.

According to a sixth aspect, a network device is provided. The network device includes a transceiver, a processor, and a memory. The processor is configured to control the transceiver to send and receive a signal. The memory is configured to store a computer program. The processor is configured to invoke the computer program from the memory and run the computer program, to enable the network device to perform the method according to any one of the second aspect or the possible implementations of the second aspect.

According to a seventh aspect, a communications apparatus is provided. The communications apparatus may be the terminal device in the foregoing method designs, or may be a chip disposed in the terminal device. The communications apparatus includes a processor that is coupled to a memory and may be configured to execute an instruction in the memory, to implement the method performed by the terminal device according to any one of the first aspect or the possible implementations of the first aspect. Optionally, the communications apparatus further includes the memory. Optionally, the communications apparatus further includes a communications interface, and the processor is coupled to the communications interface.

According to an eighth aspect, a communications apparatus is provided. The communications apparatus may be the network device in the foregoing method designs, or may be a chip disposed in the network device. The communications apparatus includes a processor that is coupled to a memory and may be configured to execute an instruction in the memory, to implement the method performed by the network device according to any one of the second aspect or the possible implementations of the second aspect. Optionally, the communications apparatus further includes the memory. Optionally, the communications apparatus further includes a communications interface, and the processor is coupled to the communications interface.

According to a ninth aspect, a computer program product is provided. The computer program product includes computer program code. When the computer program code is run on a computer, the computer is enabled to perform the methods in the foregoing aspects.

According to a tenth aspect, a computer-readable medium is provided. The computer-readable medium stores program code. When the computer program code is run on a computer, the computer is enabled to perform the methods in the foregoing aspects.

According to an eleventh aspect, a chip system is provided. The chip system includes a processor that is configured to support a terminal device in implementing functions in the foregoing aspects, for example, generating, receiving, sending, or processing data and/or information in the foregoing methods. In a possible design, the chip system further includes a memory. The memory is configured to store a program instruction and data that are necessary for the terminal device. The chip system may include a chip, or may include a chip and another discrete component.

According to a twelfth aspect, a chip system is provided. The chip system includes a processor that is configured to support a network device in implementing functions in the foregoing aspects, for example, generating, receiving, sending, or processing data and/or information in the foregoing methods. In a possible design, the chip system further includes a memory. The memory is configured to store a program instruction and data that are necessary for the terminal device. The chip system may include a chip, or may include a chip and another discrete component.

DESCRIPTION OF EMBODIMENTS

The following describes the technical solutions of this application with reference to the accompanying drawings.

The technical solutions of the embodiments of this application may be applied to various communications systems, such as a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, or a new radio access technology (NR) system.

Figure 1:
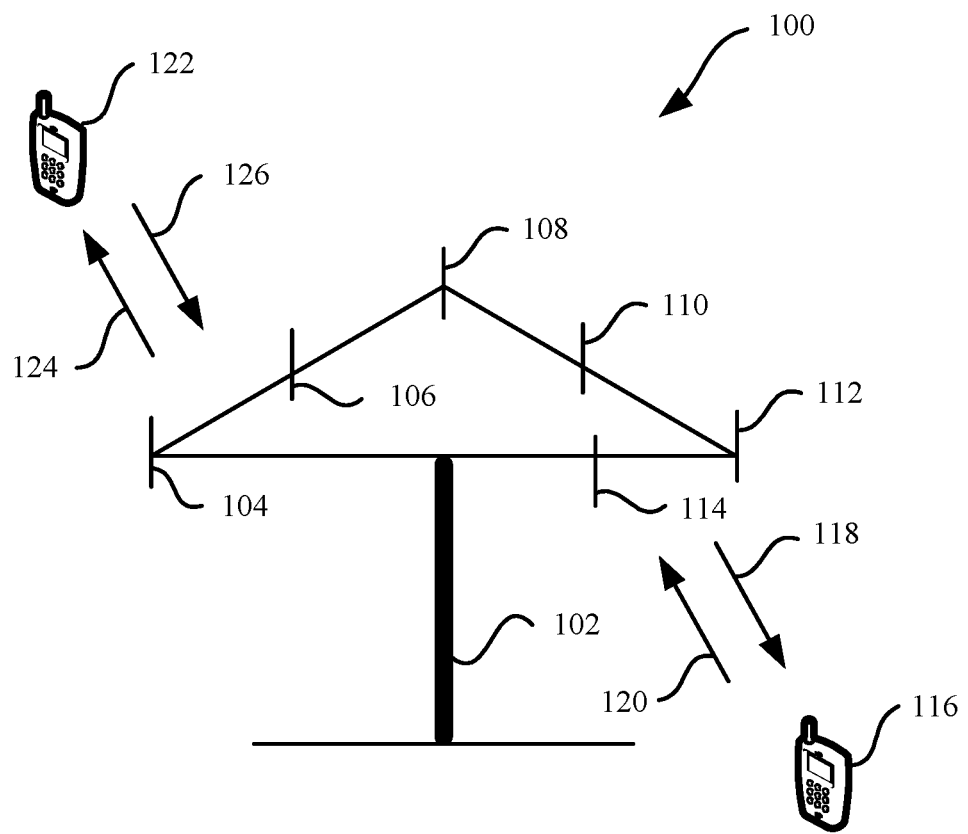
FIG. 1 is a schematic diagram of a communications system to which a communication method in an embodiment of this application is applicable.

FIG. 1 is a schematic diagram of a communications system to which a communication method in an embodiment of this application is applicable. As shown in FIG. 1, the communications system 100 includes a network device 102. The network device 102 may include a plurality of antennas, for example, antennas 104, 106, 108, 110, 112, and 114. Optionally, the plurality of antennas included in the network device 102 may be divided into a plurality of antenna groups, and each antenna group may include one or more antennas. For example, an antenna group may include the antennas 104 and 106, another antenna group may include the antennas 108 and 110, and still another antenna group may include the antennas 112 and 114.

It should be understood that, for ease of understanding, only a case in which six antennas are divided into three antenna groups is shown in the foregoing descriptions and FIG. 1. This should not constitute any limitation on this application. The network device 102 may include more or fewer antennas. The antennas included in the network device 102 may be divided into more or fewer antenna groups, and each antenna group may include more or fewer antennas.

In addition, the network device 102 may additionally include a transmitter chain and a receiver chain. A person of ordinary skill in the art may understand that the transmitter chain and the receiver chain each may include a plurality of components related to signal sending and receiving, for example, a processor, a modulator, a multiplexer, a demodulator, a demultiplexer, or an antenna.

It should be understood that a network device in the communications system may be any device having a wireless transceiver function or a chip that may be disposed in the device. The device includes but is not limited to an evolved NodeB (eNB), a radio network controller (RNC), a NodeB (NB), a base station controller (BSC), a base transceiver station (BTS), a home eNodeB (for example, a Home Node B, HNB), a baseband unit (BBU), an access point (AP) in a wireless fidelity (WIFI) system, a wireless relay node, a wireless backhaul node, a transmission point (TP), a transmission reception point (TRP), or the like; or may be a gNodeB (Next Generation NodeB, or gNB) or either a transmission point or a transmission reception point in a 5G system such as an NR system, or an antenna panel or a group (including a plurality of antenna panels) of antenna panels of a base station in a 5G system; or may be a network node that constitutes a gNB or a transmission point, for example, a baseband unit (BBU) or a distributed unit (DU).

In some deployments, the gNB may include a centralized unit (CU) and a DU.

The gNB may further include a radio frequency unit (radio unit, RU). The CU implements some functions of the gNB, and the DU implements some functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information at the RRC layer eventually becomes information at the PHY layer, or is obtained after information at the PHY layer is converted. Therefore, in this architecture, higher layer signaling, such as RRC layer signaling or PHCP layer signaling, may also be considered as being sent by the DU or sent by the DU and the RU. It may be understood that the network device may be a CU node, a DU node, or a device including a CU node and a DU node. In addition, the CU may be divided into a network device in an access network RAN, or the CU may be divided into a network device in a core network. This is not limited in this application.

The network device 102 may communicate with a plurality of terminal devices. For example, the network device 102 may communicate with a terminal device 116 and a terminal device 122. It may be understood that the network device 102 may communicate with any quantity of terminal devices similar to the terminal device 116 or 122.

It should be understood that the terminal device in the communications system may also be referred to as user equipment (UE), an access terminal, a subscriber unit, a subscriber station, a mobile station, a mobile station, a remote station, a remote terminal, a mobile device, a user terminal, a terminal, a wireless communications device, a user agent, or a user apparatus. In the embodiments of this application, the terminal device may be a mobile phone, a tablet computer (Pad), a computer having a wireless transceiver function, a virtual reality (VR) terminal device, an augmented reality (AR) terminal device, a wireless terminal in industrial control, a wireless terminal in a self driving device, a wireless terminal for telemedicine (remote medical), a wireless terminal in smart grid, a wireless terminal in transportation safety, a wireless terminal in a smart city device, a wireless terminal in a smart home, or the like. An application scenario is not limited in the embodiments of this application. In this application, the foregoing terminal device and a chip that can be disposed in the terminal device are collectively referred to as a terminal device.

As shown in FIG. 1, the terminal device 116 communicates with the antennas 112 and 114. The antennas 112 and 114 send a signal to the terminal device 116 over a forward link 118, and receive a signal from the terminal device 116 over a reverse link 120. In addition, the terminal device 122 communicates with the antennas 104 and 106. The antennas 104 and 106 send a signal to the terminal device 122 over a forward link 124, and receive a signal from the terminal device 122 over a reverse link 126.

For example, in a FDD system, the forward link 118 may use a frequency band different from that used by the reverse link 120, and the forward link 124 may use a frequency band different from that used by the reverse link 126.

For another example, in a TDD system and a full duplex system, the forward link 118 and the reverse link 120 may use a common frequency band, and the forward link 124 and the reverse link 126 may use a common frequency band.

Each group of antennas and/or an area that are/is designed for communication are/is referred to as a sector of the network device 102. For example, the antenna group may be designed to communicate with a terminal device in the sector within a coverage area of the network device 102. In a process in which the network device 102 communicates with the terminal devices 116 and 122 respectively over the forward links 118 and 124, a transmit antenna of the network device 102 may improve signal-to-noise ratios of the forward links 118 and 124 through beamforming. In addition, compared with a manner in which the network device sends a signal to all terminal devices of the network device by using a single antenna, when the network device 102 sends, through beamforming, a signal to the terminal devices 116 and 122 that are randomly scattered within a related coverage area, a mobile device in a neighboring cell suffers less interference.

The network device 102, the terminal device 116, or the terminal device 122 may be a wireless communication sending apparatus and/or a wireless communication receiving apparatus. When sending data, the wireless communications sending apparatus may encode data for transmission. Specifically, the wireless communications sending apparatus may obtain a specific quantity of data bits to be sent to the wireless communications receiving apparatus through a channel. For example, the wireless communications sending apparatus may generate, receive from another communications apparatus, or store in a memory, the specific quantity of data bits to be sent to the wireless communications receiving apparatus through the channel. The data bits may be included in a transport block or a plurality of transport blocks of the data, and the transport block may be segmented to generate a plurality of code blocks.

In addition, the communications system 100 may be a public land mobile network (PLMN), a device-to-device (D2D) network, a machine-to-machine (M2M) network, or another network. For ease of understanding, FIG. 1 is merely a simplified schematic diagram of an example. The network may further include another network device and any number of terminal devices.

In the communications system 100, the network device 102 may communicate with the terminal device 116 or 122 by using a MIMO technology. It should be understood that the MIMO technology means that a transmit end device uses a plurality of transmit antennas, and a receive end device uses a plurality of receive antennas, so that a signal is transmitted by using the plurality of antennas of the transmit end device and received by using the plurality of antennas of the receive end device. Therefore, communication quality is improved. In the MIMO technology, spatial resources can be fully used, and multiple-output multiple-input is implemented by using a plurality of antennas, so that a system channel capacity may be increased by multiple times without increasing a spectrum resource and antenna transmit power.

MIMO may be classified into single-user multiple-input multiple-output (single-user MIMO, SU-MIMO) and multi-user multiple-input multiple-output (multi-user MIMO, MU-MIMO). In massive MIMO, based on a multi-user beamforming principle, several hundreds of antennas are disposed on a transmit end device, to modulate respective beams for dozens of target receivers, and transmit dozens of signals simultaneously on a same frequency resource through spatial signal isolation. Therefore, in the massive MIMO technology, spatial freedom brought by configuring large-scale antennas can be fully used, so that spectral efficiency is improved.

In a process of performing communication by using the MIMO technology, interference between a plurality of users and interference between a plurality of layers (or streams) of a same user may be reduced through precoding. In the precoding, when a channel status is already known, a to-be-transmitted signal is preprocessed at the transmit end device. To be specific, the to-be-transmitted signal is processed by using a precoding matrix that matches the channel status, so that a precoded to-be-transmitted signal adapts to a channel, and complexity of eliminating inter-channel impact at the receive end device is reduced. Therefore, a transmitted signal is preprocessed, so that received signal quality (for example, a signal to interference plus noise ratio, SINR) is improved. Therefore, transmission between a transmit end device and a plurality of receive end devices can be performed on a same time-frequency resource through precoding. That is, the MU-MIMO is implemented. It should be noted that descriptions related to the precoding are used as only examples and are not used to limit the scope of the envisioned embodiments of this application. In a specific implementation process, precoding may be performed in other manners (where for example, when a channel matrix cannot be learned of, precoding is performed by using a preset precoding matrix or in a weighted processing manner).

In a possible implementation, the receive end device may perform channel measurement based on a reference signal sent by the transmit end device, to determine the precoding matrix that matches the channel status, and feed back the precoding matrix to the transmit end device. Currently, a method for determining a precoding matrix is already known. The receive end device performs measurement based on the received reference signal, and feeds back channel state information (CSI). The transmit end device may determine the precoding matrix based on the feedback from the receive end device. Optionally, the CSI feedback of the receive end device may be divided into two levels of feedback. In a first-level feedback, the receive end device may determine one or more superior beam vectors by traversing a plurality of orthogonal beam vectors in a first-level codebook, in other words, select one or more same beam vectors in all subbands. Therefore, the first-level feedback may be wideband feedback. In a second-level feedback, the receive end device may independently feed back amplitudes and phases in the subbands. The receive end device may determine the amplitudes and the phases by traversing amplitudes and phases in a second-level codebook in the subbands. In other words, amplitudes and phases selected in different subbands may be different. Therefore, the second-level feedback may be subband feedback. A network device may determine the precoding matrix based on the first-level feedback and the second-level feedback.

However, for the receive end device, calculation of such measurement and feedback is relatively complex. With development of the massive MIMO technology, a quantity of antenna ports tends to increase, and calculation complexity of channel measurement also increases. For the receive end device, for example, a terminal device, in downlink transmission, calculation complexity also increases. Consequently, power consumption of the receive end device may increase. This can burden the receive end device.

In view of this, this application provides a communication method, to reduce complexity of channel measurement by a receive end device, so that power consumption of the receive end device is reduced.

The following describes in detail the embodiments of this application with reference to the accompanying drawings.

It should be understood that, in the embodiments described below, "first", "second", "third", and the like are merely used to distinguish between different objects, for example, distinguish between different base vectors, different matrices, and different indication information, and should not constitute any limitation on this application.

It should be further understood that, in this application, "antenna" and "antenna port" are usually interchangeably used, but a person skilled in the art may understand meanings of "antenna" and "antenna port". It should be noted that the meanings of "antenna" and "antenna port" are consistent when a difference between "antenna" and "antenna port" is not emphasized. The antenna port may be understood as a transmit antenna identified by a receive end device, or a transmit antenna that can be distinguished in space. One antenna port is configured for each virtual antenna, each virtual antenna may be a weighted combination of a plurality of physical antennas, and each antenna port may correspond to one reference signal port.

It should be further understood that, in the embodiments described below, "pre-obtain" may include an indication or a pre-definition by using signaling of a network device, for example, a definition in a protocol. "Pre-definition" may be implemented in a manner in which corresponding code or table, or other related indication information may be pre-stored in a device (for example, including the terminal device and the network device). A specific implementation of "pre-definition" is not limited in this application.

It should be further understood that "store" in the embodiments of this application may mean that the code, table, or related information is stored in one or more memories. The one or more memories may be separately disposed, or may be integrated into an encoder, a decoder, a processor, or a communications apparatus. Alternatively, some of the one or more memories may be separately disposed, and some of the one or more memories are integrated into a decoder, a processor, or a communications apparatus. A type of the memory may be a storage medium in any form. This is not limited in this application.

It should be further understood that, in the embodiments of this application, nouns "network" and "system" are usually interchangeably used, but a person skilled in the art will understand the meanings of "network" and "system". "Information", "signal", "message", and "channel" may also be interchangeably used sometimes. It should be noted that meanings expressed by the nouns are consistent when differences among the nouns are not emphasized. "Of", and "corresponding" may be interchangeably used sometimes. It should be noted that meanings expressed by the nouns are consistent when differences among the nouns are not emphasized.

It should be further understood that, "protocol" in the embodiments of this application may be a standard protocol in the communications field, for example, may include an LTE protocol, an NR protocol, and a related protocol applied to a future communications system. This is not limited in this application.

The technical solutions in this application may be applied to a wireless communications system, for example, the communications system 100 shown in FIG. 1. The communications system may include at least one network device and at least one terminal device, and the network device and the terminal device may communicate with each other by using a wireless air interface. For example, the network device in the communications system may correspond to the network device 102 shown in FIG. 1, and the terminal device may correspond to the terminal device 116 or 122 shown in FIG. 1.

Without loss of generality, a communication method provided by this application is described in detail below by using an interaction process of a terminal device and a network device as an example. The terminal device may be any terminal device that is in a wireless communications system and that has a wireless connection relationship with the network device. It should be understood that, based on a same technical solution, the network device may communicate with a plurality of terminal devices that are in the wireless communications system and that each have a wireless connection relationship. A quantity of terminal devices or a quantity of network devices is not limited in this application.

Figure 2:
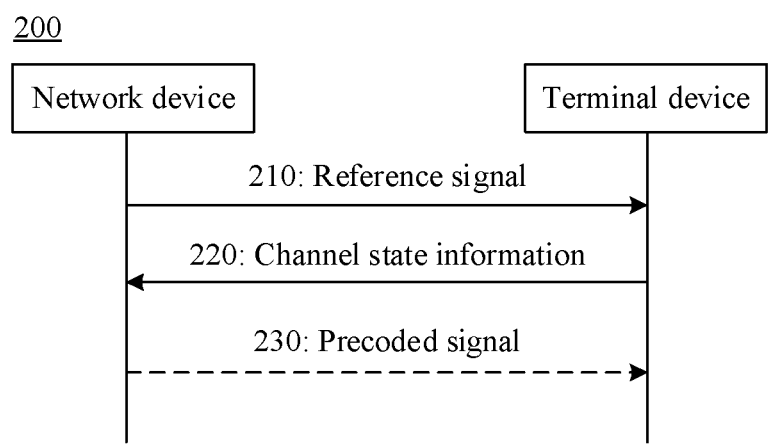
FIG. 2 is a schematic flowchart of a communication method according to an embodiment of this application.

FIG. 2 is a schematic flowchart of a communication method 200 according to an embodiment of this application from a perspective of device interaction. As shown in FIG. 2, the method 200 may include step 210 to step 230.

In step 210, a network device sends a reference signal.

Correspondingly, in step 210, a terminal device receives the reference signal. Specifically, the reference signal sent by the network device may be used for downlink channel measurement. By way of example and not limitation, the reference signal may, for example, include a channel state information-reference signal (CSI-RS). It should be understood that the CSI-RS, as the reference signal used for downlink channel measurement, is merely an example for description, and should not constitute any limitation on this application. In this application, a possibility that another reference signal, such as a downlink demodulation reference signal (DMRS), a tracking reference signal (TRS), or a phase tracking reference signal (PTRS), is defined in a future protocol to implement a same or similar function is not excluded.

In massive MIMO, the network device may be configured with a plurality of antenna ports. The network device may send the reference signal by using the plurality of configured antenna ports, so that the terminal device performs downlink channel measurement and CSI feedback.

Optionally, the plurality of antenna ports may be divided into one or more antenna port groups. When the plurality of antenna ports is divided into a plurality of antenna port groups, each antenna port group may include one or more antenna ports. In a possible design, the network device may be configured with one or more antenna panels, each antenna panel may be configured with one or more antenna port groups, and each antenna port group includes one or more antenna ports.

Figure 3:
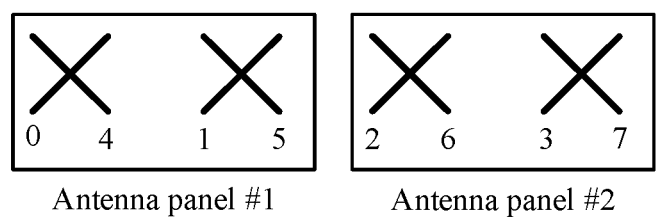
FIG. 3 is a schematic diagram of a plurality of antenna panels that each are configured with a plurality of antenna ports.

For ease of understanding, FIG. 3 is a schematic diagram of a plurality of antenna panels that each are configured with a plurality of antenna ports. Specifically, FIG. 3 is a schematic diagram of two antenna panels that each are configured with a plurality of antenna ports. The two antenna panels are configured with eight antenna ports. Each X in the figure represents two antenna ports in different polarization directions. Therefore, each antenna panel shown in FIG. 3 is configured with four antenna ports. On an antenna panel #1, an antenna port 0 and an antenna port 1 may be antenna ports in a same polarization direction, for example, a horizontal polarization direction, and may correspond to the same beam vector (which is alternatively referred to as a precoding vector), which is denoted as, for example, $b_1$. An antenna port 4 and an antenna port 5 may be antenna ports in a same polarization direction, for example, a vertical polarization direction, and may correspond to another equivalent beam vector, which is denoted as, for example, $b_2$. Similarly, on an antenna panel #2, an antenna port 2 and an antenna port 3 may correspond to the beam vector $b_1$, and an antenna port 6 and an antenna port 7 may correspond to the beam vector $b_2$. $b_1$ and $b_2$ may be two IDFT vectors that are orthogonal to each other, or may be mathematical vectors that each represent a characteristic of a spatial electromagnetic wave. This is not particularly specified in the embodiments of this application.

For ease of understanding, a case in which a plurality of antenna panels each are configured with a plurality of antenna ports is described above with reference to FIG. 3. However, a correspondence between antennas and antenna ports is not limited in the embodiments of this application, and one or more physical antennas may be configured as one antenna port. The antenna port may be understood as a transmit antenna identified by a receive end device, or a transmit antenna that can be distinguished in space. One antenna port is configured for each virtual antenna, each virtual antenna may be a weighted combination of a plurality of physical antennas, and each antenna port corresponds to one reference signal port. In the embodiments of this application, each antenna port may correspond to one reference signal port used for channel measurement. For example, in downlink channel measurement, one antenna port may correspond to one CSI-RS port used for downlink channel measurement. In this case, the antenna port may also be referred to as a CSI-RS port. In uplink channel measurement, one antenna port may alternatively correspond to one SRS port used for uplink channel measurement. In this case, the antenna port may also be referred to as an SRS port.

It should be understood that FIG. 3 is a schematic diagram provided merely for ease of understanding, and should not constitute any limitation on this application. For example, the antenna panel may alternatively be configured with more antenna ports, or the network device may be configured with fewer or more antenna panels. This is not particularly specified in the embodiments of this application.

It should be further understood that grouping of the antenna ports based on the antenna panels is merely a possible implementation, or a possible grouping rule, and should not constitute any limitation on this application. A grouping rule of the antenna port groups is not limited in this application.

In the embodiments of this application, the network device may send the reference signal to the terminal device by using one or more antenna port groups. Because different antenna port groups correspond to different polarization directions, the network device may send the reference signal in the different polarization directions, to obtain a complete channel measurement result.

When sending the reference signal to the terminal device by using the plurality of antenna ports, the network device may explicitly or implicitly indicate a quantity of the antenna ports.

Specifically, if the quantity of the antenna ports is explicitly indicated, optionally, the method further includes: The network device sends information about the quantity of the antenna ports. Correspondingly, the method further includes: The terminal device receives the information about the quantity of the antenna ports.

Optionally, the information about the quantity of the antenna ports may be carried in higher layer signaling or physical layer signaling. By way of example and not limitation, the higher layer signaling may include, for example, an RRC message or a MAC CE. By way of example and not limitation, the physical layer signaling may include, for example, downlink control information.

The downlink control information may be, for example, DCI in an LTE protocol or an NR protocol, or may be other signaling that is transmitted on a physical downlink control channel and that may be used to carry downlink control information.

It should be understood that the physical downlink control channel herein may be a PDCCH (physical downlink control channel) or an enhanced physical downlink control channel (enhanced PDCCH, or EPDCCH) that are defined in the LTE protocol or the NR protocol, may be a PDCCH in NR, or may be another downlink channel that has the foregoing function and that is defined as a network evolves.

If the quantity of the antenna ports is implicitly indicated, the quantity of the antenna ports may be pre-defined, for example, defined in a protocol.

It should be understood that the listed specific methods for obtaining the quantity of the antenna ports are merely examples for descriptions, and should not constitute any limitation on this application. The specific method for obtaining the quantity of the antenna ports is not limited in this application.

When sending the reference signal to the terminal device by using the plurality of antenna port groups, the network device may explicitly or implicitly indicate configuration information of the antenna port groups.

Specifically, if the network device explicitly indicates the configuration information of the antenna port groups, optionally, the method further includes: The network device sends the configuration information of the antenna port groups, where the configuration information of the antenna port groups may be used to indicate a quantity of the antenna port groups.

Optionally, the configuration information of the antenna port groups may be carried in higher layer signaling or physical layer signaling.

The higher layer signaling and the physical layer signaling are separately described above by using examples. For brevity, details are not described herein again.

Optionally, the configuration information of the antenna port groups may be further used to indicate information such as a port number and polarization direction of an antenna port included in each antenna port group.

If the configuration information of the antenna port groups is implicitly indicated, the quantity of the antenna ports may be pre-defined, for example, defined in a protocol.

Optionally, the network device and the terminal device may alternatively determine, according to a pre-defined grouping rule, a port number of an antenna port included in each antenna port group. For example, the pre-defined grouping rule may include: antenna ports whose port numbers are odd numbers, and antenna ports whose port numbers are even numbers; or $2N_T$ antenna ports may be arranged in ascending or descending order of antenna port numbers, antenna ports corresponding to first $N_T$ port numbers are determined as one antenna port group, and antenna ports corresponding to last $N_T$ port numbers are determined as another antenna port group.

Optionally, the configuration information of the antenna port groups may be indicated by using a combination of an explicit indication and an implicit indication.

For example, the network device indicates the quantity of the antenna port groups by using signaling, and the terminal device and the network device determine, according to a pre-defined grouping rule, a port number of an antenna port included in each antenna port group.

In this way, the terminal device may learn of a quantity of antenna port groups used by the network device to send the reference signal and a quantity of antenna ports included in each antenna port group. It should be understood that the listed methods for indicating the configuration information of the antenna port groups are merely examples for description and should not constitute any limitation on this application. A specific method for obtaining the configuration information of the antenna port groups is not limited in this application.

Optionally, the method further includes the following step:

The network device sends position information of a time-frequency resource of the reference signal.

For example, the position information of the time-frequency resource of the reference signal may be determined based on a pilot pattern.

Optionally, the method further includes the following step:

The network device sends configuration information of a periodicity and subframe offset of the reference signal.

The periodicity and subframe offset of the reference signal may be used to determine a time domain position of the reference signal.

Optionally, the method further includes the following step:

The network device sends position information of a start resource block RB of the reference signal and/or information about a quantity of RBs.

The position information of the start RB of the reference signal and/or the information about the quantity of RBs may be used to determine a frequency domain position of the reference signal and/or a size of an occupied frequency domain resource. By way of example and not limitation, a position of the start RB of the reference signal may be determined based on, for example, an offset relative to a bandwidth part (BWP) of the terminal device.

Optionally, the position information of the time-frequency resource of the reference signal, the configuration information of the periodicity and subframe offset, the position information of the start RB and/or the information about the quantity of RBs, and the like that are listed above may all be referred to as configuration information of the reference signal, and may be used to determine the time-frequency resource of the reference signal. The configuration information is indicated by using higher layer signaling or physical layer signaling, or may be indicated by using a combination of higher layer signaling and physical layer signaling, or may be indicated by using same signaling, or may be indicated by using different signaling. For a specific indication manner, refer to the prior art. For brevity, detailed descriptions of an indication manner of the configuration information are omitted herein, and the indication manner of the configuration information is not limited in this application.

In step 220, the terminal device sends CSI.

Correspondingly, in step 220, the network device receives the CSI.

In the embodiments of this application, the CSI may be used to indicate a measured value set. The measured value set may include one or more measured values. Each measured value corresponds to one antenna port group used to send the reference signal.

In a possible implementation, that the measured value is related to a first group of base vectors and a second group of base vectors, or the measured value is related to a Kronecker product of the first group of base vectors and the second group of base vectors may be implemented by processing a channel matrix based on the first group of base vectors and the second group of base vectors, or may be implemented by processing a precoding matrix based on the first group of base vectors and the second group of base vectors. For example, the terminal device may perform channel estimation based on the received reference signal to obtain the channel matrix, and may further obtain the precoding matrix based on the channel matrix, for example, perform singular value decomposition (SVD) on the channel matrix. The channel matrix is assumed to be H, and SVD is performed on the channel matrix to obtain:

$$H = U \cdot S \cdot V^H,$$

where y and $V^H$ are unitary matrices, S is a diagonal matrix, and non-zero elements (namely, elements on a diagonal) of the diagonal matrix are singular values of the channel matrix H. These singular values may be usually arranged in descending order. A conjugate transpose V of the right unitary matrix $V^H$ is the precoding matrix. In other words, the precoding matrix is a precoding matrix obtained through calculation based on the channel matrix H.

It should be understood that the method for determining the precoding matrix through SVD in the foregoing example is merely a possible implementation, and should not constitute any limitation on the embodiments of this application. For example, the network device may alternatively determine the precoding matrix by using a receiver algorithm such as a minimum mean square error (MMSE), zero-forcing (ZF), or maximum ratio combining (MRC).

It should be noted that the precoding matrix determined by using the method for determining the precoding matrix in the foregoing example may be the same as or close to a precoding matrix used in a signal processing process. The precoding matrix determined by using the method in the foregoing example may be understood as an ideal precoding matrix.

Channel measurement may be performed based on the reference signal, to obtain the channel matrix, or further obtain the precoding matrix. Therefore, the measured value may be related to the channel matrix, or the measured value may be related to the precoding matrix. The terminal device indicates the measured value to the network device by using the CSI, so that the network device determines the precoding matrix based on the measured values. The network device may directly use the measured value as the precoding matrix, or may transform the measured value to obtain the precoding matrix. A specific process of determining the precoding matrix based on the measured value is described in detail below and with reference to specific embodiments.

For ease of understanding and description, one antenna port group is used as an example to describe the measured value. The antenna port group may be one of the plurality of antenna port groups used to send the reference signal. The measured value may include R columns, and a dimension of each column is $(N_T \cdot N_{SB}) \times 1$. Alternatively, the measured value includes R matrices, and a dimension of each matrix is $N_T \times N_{SB}$, where $N_T$ is a quantity of antennas in the antenna port group, $N_{SB}$ is a quantity of frequency domain units for transmitting the reference signal, and R is determined based on a quantity of antennas for receiving the reference signal or a rank of the channel matrix, where $p \geq 1$, $N_T \geq 1$, $N_{SB} \geq 1$, $R \geq 1$, and $N_T$, $N_{SB}$, and R are all positive integers.

Optionally, the measured value may be related to the first group of base vectors and the second group of base vectors, or the measured value may be related to the Kronecker product of the first group of base vectors and the second group of base vectors.

For example, the terminal device may process the channel matrix based on at least the first group of base vectors and the second group of base vectors, or may process the precoding matrix based on the first group of base vectors and the second group of base vectors. In other words, the first group of base vectors and the second group of base vectors may be used to perform transformation on the channel matrix or the precoding matrix.

The first group of base vectors may include a plurality of column vectors, and each of the plurality of column vectors may be an IDFT vector, or may be a Kronecker product of two IDFT vectors. The second group of base vectors may include a plurality of DFT vectors.

Optionally, the first group of base vectors may include a plurality of column vectors, and each of the plurality of column vectors may be any one of the following:

(a) an IDFT vector, where for example, an $m^{th}$ ($0 \leq m \leq N-1$) base vector included in this group of base vectors may be an N-dimensional IDFT vector (where $N \geq 1$, and N is a positive integer), and a mathematical expression of the IDFT vector may be, for example, $$IDFT_m^N = \exp\left(j\frac{2\pi}{N}m[0, 1, \ldots, N-1]^T\right);$$

or (b) a product of an IDFT vector and a scalar value; or (c) a product of an IDFT vector and a DFT vector, where a mathematical expression of the DFT vector may be, for example, $$DFT_m^N = \exp\left(-j\frac{2\pi}{N}m[0, 1, \ldots, N-1]^T\right);$$

or (d) a product of an IDFT vector and a discrete cosine transform DCT (Discrete Cosine Transform, DCT) vector, where a mathematical expression of the first element $DC_0^N$ of an $m^{th}$ N-dimensional base vector in the DCT vector may be, for example, $$DCT_0^N = \sqrt{\frac{1}{N}},$$

and a mathematical expression of remaining (N−1) elements $DCT_m^N$ may be, for example, $$DCT_m^N = \sqrt{\frac{2}{N}} \cos\left(\frac{2m+1}{2N}\pi[1, \ldots, N-1]^T\right);$$

or (e) a product of an IDFT vector and an inverse discrete cosine transform (IDCT) vector, where the first N-dimensional base vector in the IDFT vector may be, for example, $$IDCT_0^N = \sqrt{\frac{1}{N}} [1, 1, \ldots, 1]^T,$$

and an $m^{th}$ N-dimensional base vector may be, for example, $$IDCT_m^N = \sqrt{\frac{2}{N}} \cos\left(\frac{2[0, 1, \ldots, N-1]^T + 1}{2N}\pi m\right);$$

(f) a Kronecker product of two IDFT vectors; or
(g) a Kronecker product of two DFT vectors; or
(h) a Kronecker product of two DCT vectors; or
(i) a Kronecker product of two IDCT vectors.

The Kronecker product is a direct product of two matrices, namely, a block matrix obtained after all elements in one matrix are multiplied by another matrix. For example, a Kronecker product of a k×l-dimensional matrix A and a P×q-dimensional matrix B is a kp×lq-dimensional matrix $$A \otimes B = \begin{bmatrix} a_{11}B & \cdots & a_{1l}B \\ \vdots & \ddots & \vdots \\ a_{k1}B & \cdots & a_{kl}B \end{bmatrix}.$$

In the embodiments of this application, the terminal device may pre-obtain the first group of base vectors and the second group of base vectors.

The first group of base vectors and the second group of base vectors may be separately pre-defined, for example, defined in a protocol, or may be configured by the network device for the terminal device, or may be fed back by the terminal device to the network device. This is not limited in this application. If the first group of base vectors and the second group of base vectors are configured by the network device for the terminal device, the first group of base vectors and the second group of base vectors may be indicated by using same signaling, or may be indicated by using different signaling. This is not limited in this application.

If the first group of base vectors and the second group of base vectors are pre-defined, the network device and the terminal device may pre-store a set (which is denoted as a first set for ease of differentiation and description) of a plurality of groups of column vectors that may be used as the first group of base vectors, and a set (which is denoted as a second set for ease of differentiation and description) of a plurality of groups of column vectors that may be used as the second group of base vectors. The first set may include one-to-one correspondences between a plurality of groups of base vectors and a plurality of indexes, and each of the plurality of groups of base vectors may be an $N_T \times N_1$-dimensional matrix. Column vectors in each group of base vectors may be not completely orthogonal, namely, non-orthogonal base vectors, or may be completely orthogonal, namely, orthogonal base vectors. Optionally, the orthogonal base vector may be a complete orthogonal base vector, or may be an incomplete orthogonal base vector. The complete orthogonal base vector meets: Any vector whose dimension is the same as that of the complete orthogonal base vector may be represented by a linear combination including the orthogonal base vector. The second set may include one-to-one correspondences between a plurality of groups of base vectors and a plurality of indexes, and each of the plurality of groups of base vectors may be an $N_{SB} \times N_2$-dimensional matrix.

If the first group of base vectors and the second group of base vectors are configured by the network device, optionally, the method further includes the following steps:

The network device sends indication information of the first group of base vectors.

The network device sends indication information of the second group of base vectors.

In the first set, the plurality of groups of base vectors may one-to-one correspond to the plurality of indexes. In the second set, the plurality of groups of base vectors may one-to-one correspond to the plurality of indexes. The network device may send the index of the first group of base vectors and the index of the second group of base vectors to the terminal device separately by using signaling.

Alternatively, optionally, the method further includes the following step:

The network device sends indication information of the first group of base vectors and the second group of base vectors.

A combination of one group of base vectors in the first set and one group of base vectors in the second set may correspond to one index. Therefore, the network device may indicate, in a joint coding manner, the first group of base vectors and the second group of base vectors by using an index.

Alternatively, the network device may indicate the first group of base vectors and the second group of base vectors to the terminal device by using a bitmap, and each bit in the bitmap may correspond to one group of base vectors. For example, when a bit in the bitmap is set to "0", it indicates that one group of base vectors that corresponds to "0" is not the first group of base vectors or the second group of base vectors; when a bit in the bitmap is set to "1", it indicates that one group of base vectors that corresponds to "1" is the first group of base vectors or the second group of base vectors.

It should be understood that a specific method for indicating, by the network device, the first group of base vectors and the second group of base vectors to the terminal device may be implemented by using a method in the prior art. For brevity, details are not described herein. It should be further understood that the foregoing examples are merely several possible implementations, and should not constitute any limitation on this application.

Optionally, before indicating the first group of base vectors and the second group of base vectors to the terminal device, the network device may determine the first group of base vectors and the second group of base vectors in advance.

In a possible implementation, the first group of base vectors is determined based on an SRS or a DMRS sent by the terminal device. For example, a reciprocal uplink channel is estimated based on the SRS or DMRS, and feature decomposition is performed on the uplink channel to obtain a feature matrix; a pre-stored set including a plurality of groups of base vectors is searched for one group of base vectors, namely, the first group of base vectors, that has a minimum distance from the feature matrix; or the set including the plurality of groups of base vectors is traversed, and the first group of base vectors is determined based on a capacity maximization criterion, a signal to interference plus noise ratio (SINR) maximization criterion, or another criterion. It should be understood that the specific method for determining the first group of base vectors is merely an example for description. A specific process of determining the first group of base vectors based on a minimum distance, a maximization criterion, and the like may be similar to that in the prior art. For brevity, details are not described herein again.

If the first group of base vectors and the second group of base vectors are fed back by the terminal device to the network device, the terminal device may indicate the first group of base vectors and the second group of base vectors by using the CSI.

In a possible design, the network device and the terminal device may prestore a set (namely, a first set) of a plurality of groups of column vectors that may be used as the first group of base vectors and a set (namely, a second set) of a plurality of groups of column vectors that may be used as the second group of base vectors. The foregoing has described in detail the plurality of groups of base vectors in the first set and the plurality of groups of base vectors in the second set. For brevity, details are not described herein again.

The terminal device may traverse the plurality of groups of base vectors in the first set and the plurality of groups of base vectors in the second set to determine the first group of base vectors and the second group of base vectors that are both to be fed back. The following describes in detail a method for determining the first group of base vectors and the second group of base vectors by the terminal device with reference to Manner 4, below.

It should be understood that the foregoing specific methods for obtaining the first group of base vectors and the second group of base vectors by the terminal device are merely examples for description, and should not constitute any limitation on this application. For example, the first group of base vectors and the second group of base vectors may be determined in combination with configuration by the network device and feedback by the terminal device. For example, the network device configures the first group of base vectors; the terminal device traverses all groups of base vectors in a pre-defined second set to select the second group of base vectors, and feeds back the second group of base vectors to the network device.

In the embodiments of this application, the terminal device may alternatively pre-obtain the Kronecker product of the first group of base vectors and the second group of base vectors. The Kronecker product of the first group of base vectors and the second group of base vectors may be pre-defined, for example, defined in a protocol, or may be configured by the network device for the terminal device. This is not limited in this application.

A specific method for configuring the Kronecker product of the first group of base vectors and the second group of base vectors by the network device or defining the Kronecker product in a protocol is similar to a specific method for configuring the first group of base vectors and the second group of base vectors by the network device or defining the first group of base vectors and the second group of base vectors in a protocol. For brevity, details are not described herein again.

Based on the foregoing definitions of the first group of base vectors and the second group of base vectors, a person skilled in the art may understand that transformation on the channel matrix or the ideal precoding matrix may include at least IDFT and DFT on the channel matrix or the ideal precoding matrix.

In the embodiments of this application, the terminal device may measure and feed back the $N_{SB}$ frequency domain units based on a group of antenna ports that includes $N_T$ antenna ports. In this case, the first group of base vectors may include $N_1 N_T \times 1$-dimensional column vectors, and the second group of base vectors may include $N_2$ $N_{SB} \times 1$-dimensional column vectors. Therefore, the first group of base vectors may be represented by using an $N_T \times N_1$-dimensional matrix, and the second group of base vectors may be represented by using an $N_{SB} \times N_2$-dimensional matrix. $0 < N_1 \leq N_T$, $0 < N_2 \leq N_{SB}$, $N_1$ and $N_2$ are both integers, and values of $N_1$ and $N_2$ may be the same or different. This is not limited in this application. The frequency domain unit may include, for example, a subband or a physical resource block (PRB), or may be another unit defined in an existing or future protocol and used to indicate a frequency domain resource. This is not limited in this application. The quantity $N_{SB}$ of frequency domain units may be pre-defined by a system or configured by the network device by using signaling. This is not limited in this application.

For an antenna array in massive MIMO, there are a relatively large quantity of antennas, and a plurality of beams may be formed in space. These beams may have different spatial directions, or even a beam may be formed in any direction. First IDFT may be understood as projection of channel matrices or ideal precoding matrices of antennas to a beam domain. As a quantity of the antennas increases, the beams become narrower, spatial channel correlation becomes higher, and a quantity of beams that have relatively good signal quality and that arrive at the terminal device is smaller. Therefore, a quantity of channel matrices or ideal precoding matrices transformed to the beam domain also becomes smaller, so that only one or more beams that can arrive at the terminal device and that have relatively good signal quality may be further measured. Due to factors such as frequency selectivity and fading, amplitudes and/or phases fed back by a same beam in different frequency domain units (for example, subbands or PRBs) may be different in different subbands. DFT transformation may be understood as projection from a beam domain-frequency domain to a beam domain-time domain. Therefore, a channel matrix or an ideal precoding matrix in frequency domain may be converted into a channel matrix or an ideal precoding matrix in time domain, so that a plurality of amplitudes and/or phases that one-to-one correspond to a plurality of (for example, $N_{SB}$) frequency domain units and that are independently fed back in frequency domain may be converted into amplitudes and/or phases of a plurality of points (denoted as M) in time domain. $N_{SB}$ is usually greater than M. The M points may be beams that have higher powers and that are obtained after the transformation. A value of M may be pre-defined, for example, defined in a protocol, or indicated by the network device, or fed back by the terminal device. This is not limited in this application.

To feed back the channel matrix or the precoding matrix, the terminal device may indicate the measured value to the network device based on the first group of base vectors and the second group of base vectors.

For ease of understanding, an example in which the precoding matrix is used as a to-be-transformed object is used for description herein. It is assumed that the first group of base vectors is denoted as $G_1$, the second group of base vectors is denoted as $G_2$, and the precoding matrix is denoted as V. In this case, a possible form obtained by transforming the precoding matrix based on the first group of base vectors and the second group of base vectors may be $G_1^* V (G_2^*)$. For ease of differentiation, $G_1^* V (G_2^*)$ may be denoted as V'. To feed back the precoding matrix V, V' obtained after the transformation may be further transformed, and an obtained possible form of the measured value may be $G_1 V' G_2^T$. $V' = G_1^* V (G_2^*)^T$ may be substituted into $G_1 V' G_2^T$ to obtain $G_1 G_1^* V (G_2^*)^T G_2^T$, namely V.

The CSI fed back by the terminal device may be a quantized value of the measured value. It should be understood that the transformation process described above is merely described for ease of understanding, and an actual transformation process may not be limited to the foregoing listed steps. The terminal device determines the measured value based on the channel matrix or the precoding matrix, and a specific quantization method of the measured value is described in detail below with reference to a specific embodiment. Detailed descriptions of the specific process are omitted herein.

Optionally, the method 200 further includes step 230: The network device precodes a to-be-sent signal based on the precoding matrix determined based on the measured value indicated by the CSI, and sends a precoded signal.

After receiving the CSI, the network device may determine the precoding matrix based on the measured value indicated by the CSI, so that the network device can precode the to-be-sent signal based on the determined precoding matrix, and send the precoded signal.

Correspondingly, in step 230, the terminal device receives the precoded signal.

Specifically, the CSI sent by the terminal device in step 220 may be used to determine the channel matrix or the precoding matrix. In a possible implementation, the network device may further determine, based on the determined channel matrix or precoding matrix, a precoding matrix used to precode the to-be-sent signal. The precoding matrix is a precoding matrix of an antenna domain-frequency domain. In another possible implementation, the network device may alternatively further transform the measured value based on the first group of base vectors and the second group of base vectors, to determine a precoding matrix of a beam domain-delay domain, and then precode the to-be-sent signal. A specific method for processing the to-be-sent signal by the network device is not limited in this application.

It should be noted that, the CSI fed back by the terminal device is determined based on a pre-defined codebook and a plurality of times of transformation. Therefore, the channel matrix (or the precoding matrix) determined by the network device based on the CSI may be the same as or close to the channel matrix (or the precoding matrix) determined by the terminal device based on the reference signal. The precoding matrix determined by the network device in this way may be better adapted to a current channel status. Therefore, the terminal device can have better receiving performance.

Therefore, according to the foregoing technical solutions, the terminal device may process the channel matrix or the precoding matrix based on the first group of base vectors and the second group of base vectors, and feed back the processed result to the network device by using the CSI. The network device may determine the measured value based on the CSI, to further determine the precoding matrix. The terminal device may obtain the to-be-fed-back CSI through fast computation of the FFT and the IFFT. However, in a prior-art process, a terminal device traverses all codewords in a codebook to determine a precoding matrix. Therefore, complexity of calculation by the terminal device may be significantly reduced. This helps reduce power consumption of the terminal device. In addition, the CSI is fed back, so that the network device determines the proper precoding matrix to precode the to-be-sent signal. This improves data transmission reliability. In other words, the data transmission reliability is ensured, channel measurement complexity is significantly reduced, and power consumption is reduced. Therefore, this helps improve performance of an entire communications system.

The following describes in detail, with reference to specific embodiments, a process in which the terminal device obtains the measured value based on the first group of base vectors and the second group of base vectors, and feeds back the CSI, and a process in which the network device determines the precoding matrix based on the CSI.

In the embodiments of this application, the terminal device may transform the channel matrix based on the first group of base vectors and the second group of base vectors, or may transform the ideal precoding matrix based on the first group of base vectors and the second group of base vectors. Measured values obtained by processing different matrices may be different. In the following descriptions, the channel matrix and ideal precoding matrix are used as examples to separately describe in detail a process of obtaining the measured value based on the first group of base vectors and the second group of base vectors.

It should be noted that the network device may send the reference signal by using a plurality of transmit antennas (namely, antenna ports). The plurality of antenna ports may belong to a same antenna port group, or the plurality of antenna ports may alternatively belong to different antenna port groups. The terminal device may receive the reference signal by using a plurality of receive antennas (namely, antenna ports). In any frequency unit of the terminal device, a dimension of the channel matrix may be: a quantity of the transmit antennas x a quantity of the receive antennas.

For ease of description and understanding, the following describes the embodiments of this application in detail by using a process in which a receive antenna of a terminal device performs measurement and feedback based on a reference signal sent through an antenna port in a transmit antennas group as an example. The transmit antenna group of the network device may be configured with $N_T$ (where $N_T \geq 1$, and $N_T$ is a positive integer) antenna ports, and the terminal device may be configured with $N_R$ (where $N_R \geq 1$, and $N_R$ is a positive integer) receive antennas. It should be understood that the network device may be configured with a plurality of antenna port groups, and each antenna port group may include $N_T$ antenna ports. A quantity of transmit antennas configured for the network device and a quantity of receive antennas are not limited in this application.

In addition, the terminal device may perform channel measurement and feedback in $N_{SB}$ frequency units configured by a system.

$N_{SB}$ may be determined based on a matrix dimension of a second group of base vectors. For example, a quantity of rows included in the second group of base vectors may be $N_{SB}$. Alternatively, $N_{SB}$ may be determined based on at least one of the following parameters: a system bandwidth, a CSI-RS bandwidth, a BWP bandwidth, or a feedback bandwidth. For example, $N_{SB}$ is determined based on a pre-defined correspondence between $N_{SB}$ and any one of a carrier bandwidth, the CSI-RS bandwidth, the BWP bandwidth, a carrier frequency, or the CSI feedback bandwidth, and any one of a configured carrier bandwidth, CSI-RS bandwidth, BWP bandwidth, carrier frequency, or CSI feedback bandwidth.

Based on the foregoing parameters, in an $n_{sb}^{th}$ ($1 \leq n_{sb} \leq N_{SB}$) frequency unit of the $N_{SB}$ frequency units, a dimension of a channel matrix (which is denoted as, for example, $H_{sb}$ for ease of differentiation) may be $N_T \times N_R$. For each receive antenna of the terminal device, a dimension of a channel matrix (which is denoted as, for example, $H_r$ for ease of differentiation) in a space domain-frequency domain may be $N_T \times N_{SB}$. An $n_{sb}^{th}$ column in the channel matrix is corresponding coefficients of channels from all antenna ports in the $n_{sb}^{th}$ frequency unit to the receive antenna, and may correspond to a transpose of an $H_r^{th}$ row in the channel matrix $H_{sb}$.

The terminal device may perform SVD on a channel matrix corresponding to each receive antenna, to obtain a precoding matrix corresponding to the receive antenna. Therefore, for an $r^{th}$ ($1 \leq r \leq N_R$) receive antenna of the terminal device, or for a channel matrix whose rank is A (where $1 \leq A \leq \min\{N_T, N_R\}$, and R is an integer) and for an $r^{th}$ ($1 \leq r \leq A$) layer (layer), a dimension of the precoding matrix (which is denoted as, for example, $V_r$ for ease of differentiation) may also be $N_T \times N_{SB}$.

It should be noted that, the quantity $N_T$ of transmit antennas configured for the network device may be usually greater than or equal to the quantity $N_R$ of receive antennas configured for the terminal device. That is, $1 \leq A \leq N_R$. In the following, unless otherwise specified, $A=N_R$ is assumed for ease of description. However, it should be understood that this should affect this application, and A may alternatively be a positive integer less than $N_R$. In addition, a value of the rank may be determined by an RI fed back by the terminal device.

To be specific, the measured value may include R columns, and a dimension of each column may be $(N_T \cdot N_{SB}) \times 1$; or the measured value may include R matrices, and a dimension of each matrix may be $N_T \times N_{SB}$.

It is assumed that a first group of base vectors is $G_1$, a second group of base vectors is $G_2$, a dimension of the first group of base vectors may be, for example, $N_T \times N_1$, and a dimension of the second group of base vectors may be, for example, $N_{SB} \times N_2$.

In the following descriptions, the channel matrix and the precoding matrix are each used as a to-be-transformed object of terminal device, to describe in detail a process in which the terminal device feeds back CSI and a process in which the network device determines the precoding matrix based on the CSI.

1: The Precoding Matrix is Used as the to-be-Transformed Object.

A possible form obtained by transforming the precoding matrix $V_r$ based on the first group of base vectors and the second group of base vectors is $G_1{}^*V_r(G_2{}^*)^T$. For ease of differentiation, $G_1{}^*>^*V_r(G_2{}^*)^T$ may be denoted as $V_{P,T}$. It may be learned from the dimensions and transformation of the foregoing matrices that, a dimension of $V_{P,T}$ may be $N^1 \times N_2$. To feed back the precoding matrix $V_r$, $V_r$ may be further transformed to obtain a measured value $y_r$. The measured value $y_r$ may be understood as a measured value corresponding to the $r^{th}$ receive antenna, or a measured value corresponding to the $r^{th}$ layer.

In the embodiments of this application, a possible form of the measured value $y_r$ may be $G_1 V_{P,T} G_2{}^T$. $V_{P,T} = G_1{}^{**}V_r (G_2{}^*)^T$ may be substituted into $G_1 V_{P,T} G_2{}^T$, to obtain $G_1 G_1{}^* V_r (G_2{}^*) G_2{}^T$, namely, $V_r$. It may be understood that a dimension of $V_r$ may be $N_T \times N_{SB}$.

In other words, the terminal device may feed back the precoding matrix $V_r$ to the network device by using the CSI.

A person skilled in the art may understand that the measured value obtained through the transformation may be related to the first group of base vectors and the second group of base vectors, or the measured value may be related to a Kroneckerproduct of the first group of base vectors and the second group of base vectors.

In the embodiments of this application, the terminal device may transform the precoding matrix and the network device may determine the precoding matrix based on the CSI in at least any one of the following four manners. The following separately describes the four manners in detail.

A: Manner 1

In the manner 1, step (i) to step (viii) may be included. Step (i) to step (v) may be operations performed by the terminal device, and step (vi) and step (vii) may be operations performed by the network device.

Step (i):

The terminal device may perform IDFT on each column of an ideal precoding matrix based on the first group of base vectors, to obtain an $N_1 \times N_{SB}$-dimensional matrix.

For example, the terminal device may left multiply the $N_T \times N_{SB}$-dimensional precoding matrix $V_r$ by a conjugate transpose $G_1{}^*$ of the first group $G_1$ of base vectors whose dimension is $N_T \times N_1$, to obtain, for example, $V_P$. $V_P = G_1{}^* V_r$. In this case, a dimension of $V_P$ may be $N_1 \times N_{SB}$.

Step (ii):

The terminal device may perform, based on the second group of base vectors, DFT on each row of a result obtained through IDFT, to obtain an $N_1 \times N_2$-dimensional matrix.

For example, a conjugate transpose of the second group $G_2$, of base vectors whose dimension is $N_{SB} \times N_2$, is right multiplied by the $N_1 \times N_{SB}$-dimensional matrix $V_P$, to obtain, for example, $V_{P,T}$. $V_{P,T} = V_P(G_2{}^*)^T$. In other words, $V_{P,T} = G_1{}^* V(G_2{}^*)^T$. In this case, a dimension of $V_{P,T}$ may be $N_1 \times N_2$.

Step (iii):

The terminal device may determine M beams based on the matrix obtained through IDFT.

For example, based on a pre-obtained value of M, all elements in the matrix $V_{P,T}$ obtained through IDFT are sequenced in descending order of powers, M elements having higher power values are found, and a remaining element is set to zero. The power may be in direct proportion to a square of an amplitude value. Therefore, M elements having higher absolute amplitude values may be determined in the $N_T \times N_{SB}$ elements included in the matrix obtained through IDFT. In the $N_1 \times N_2$ elements of $V_{P,T}$, a power of any one of the M elements having higher powers is greater than a power of any one of remaining ($N_1 \times N_2 - M$) elements. The terminal device may set the remaining ($N_1 \times N_2 - M$) elements to zero, to obtain a processed matrix (which is denoted as, for example, a first matrix for ease of differentiation and description). A dimension of the first matrix may still be $N_1 \times N_2$.

Step (iv):

The terminal device may convert the first matrix into an $(N_1 \cdot N_2) \times 1$-dimensional column vector.

The terminal device may convert the first matrix whose dimension is $N_1 \times N_2$ into the $(N_1 \cdot N_2) \times 1$-dimensional column vector. For example, elements in the second column to an $N_2{}^{th}$ column in the first matrix whose dimension is $N_1 \times N_2$ may be sequentially concatenated below the elements in the first column, to obtain the $(N_1 \cdot N_2) \times 1$-dimensional column vector. The first element to an $N_1{}^{th}$ element in the column vector may correspond to the first column of the matrix, an $(N_1+1)^{th}$ element to the $(2N_1)^{th}$ element in the column vector may correspond to the second column of the matrix, and so on. For ease of differentiation and description, for example, the column vector is denoted as u. The column vector u may include $N_1 \times N_2$ complex number elements, and M of the elements are non-zero elements.

Positions of the M non-zero elements may be used to indicate positions of the M beams. Specifically, the positions of the M non-zero elements in $N_1 \times N_2$ rows of the column vector u may correspond to the positions of the M beams in $N_1 \times N_2$ columns of a pre-defined matrix whose dimension is $(N_T \cdot N_{SB}) \times (N_1 \cdot N_2)$, and M column vectors in the $N_1 \times N_2$ columns are beam vectors of the M beams. The pre-defined matrix whose dimension is $(N_T \cdot N_{SB}) \times (N_1 \cdot N_2)$ may be a Kronecker product $G_1 \otimes G_2$ of the first group $G_1$ of base vectors and the second group $G_2$ of base vectors. For the terminal device, a signal transmitted by using the M beams has relatively good signal receiving quality. In other words, the M beams are selected superior M beams.

A value of M may be pre-defined, for example, defined in a protocol, or indicated by the network device. This is not limited in this application.

If the value of M is indicated by the network device, optionally, the method further includes: The terminal device receives indication information of M. Correspondingly, the network device sends the indication information of M.

Optionally, the indication information of M may be carried in higher layer signaling, or may be carried in physical layer signaling. By way of example and not limitation, the higher layer signaling includes, for example, an RRC message or a MAC CE. By way of example and not limitation, the physical layer signaling includes, for example, DCI.

Step (v):

The terminal device sends the CSI. The CSI may be used to indicate the measured value.

When performing measurement and feedback based on $N_R$ receive antennas or $N_R$ layers, the terminal device may send $N_R$ groups of indication information to the network device. For an antenna port group, optionally, the CSI may include $N_R$ groups of indication information, and each group of indication information may include one or more of the following items:

(a) indication information of the M beams;
(b) indication information of amplitude coefficients corresponding to the M beams; or
(c) indication information of phase coefficients corresponding to the M beams.

In some cases, the network device may pre-define any one or two of the three items (a) to (c), and needs to feed back only remaining two items or one item. For example, if the network device pre-defines the M beams, the terminal device may feed back only the indication information of the amplitude coefficients corresponding to the M beams and the indication information of the phase coefficients corresponding to the M beams. For another example, if the network device pre-defines the M beams and the amplitude coefficients of the M beams, the terminal device may feed back only the phase coefficients of the M beams. For brevity, examples are not listed herein one by one.

It should be noted that, in the embodiments of this application, $N_R$ groups of indication information that correspond to the $N_R$ columns may be fed back independent of each other, or may be fed back in a different manner. For example, when M base vectors, M amplitude coefficients corresponding to the M base vectors, and M phase coefficients corresponding to the M base vectors are all fed back by the terminal device, one of the $N_R$ columns may be indicated by using the M base vectors, M absolute amplitudes, and M absolute phases, and remaining $(N_R-1)$ columns may be indicated by using the M base vectors, M relative amplitudes, and M relative phases. This is not limited in this application.

The following separately describes in detail specific manners in which the terminal device indicates the items (a) to (c).

(a) Indication information of the M beams:

The indication information of the M beams may be information about the positions of the M elements having higher powers in the $(N_1 \cdot N_2) \times 1$-dimensional column vector u. In a possible design, the positions of the M elements having higher powers may be indicated in a joint coding manner. Therefore, overheads of $$\log_2 \binom{N_1 \times N_2}{M}$$

bits may be required. In another possible design, the positions of the elements having higher powers may be indicated by using a bitmap. Each bit corresponds to one element in the first matrix. Therefore, overheads of $N_1 \times N_2$ bits may be required.

It should be understood that the foregoing listed specific methods for indicating the M beams are merely several possible implementations, and should not constitute any limitation on this application. In this application, another manner of indicating the positions of the M beams in the first matrix, whose dimension is $N_1 \times N_2$, is not excluded.

A person skilled in the art may understand that the M beams may correspond to the M beam vectors, or M base vectors. Therefore, in a possible implementation, the positions of the M elements in the $(N_1 \times N_2) \times 1$-dimensional column vector u are positions of the M base vectors in the Kronecker product $G_1 \otimes G_2$ of the first group $G_1$ of base vectors and the second group $G_2$ of base vectors. A dimension of $G_1 \otimes G_2$ may be $(N_T \cdot N_{SB}) \times (N_1 \cdot N_2)$. In other words, the positions of the M beams in the $N_1 * N_2$ rows of the $(N_1 \cdot N_2) \times 1$-dimensional column vector u may correspond to the positions of the M base vectors in the $N_1 \cdot N_2$ columns of W. The M base vectors may be the M columns determined in the $N_1 \cdot N_2$ columns in $G_1 \otimes G_2$, and each column includes $N_T \cdot N_{SB}$ elements.

Therefore, the indication information of the M beams may include positions of the M base vectors in a preconfigured matrix. The preconfigured matrix is a matrix obtained based on $G_1 \otimes G_2$.

In another possible implementation, in the M base vectors corresponding to the M beams, each base vector may meet $v_i = g_{i,1} \otimes g_{i,2}$ where v may be an $i^{th}$ base vector in the M base vectors, $1 \leq i \leq M$, and i is a positive integer; $g_{i,1}$ may be an $N_T \times 1$-dimensional column vector, may be understood as a first component of the $i^{th}$ base vector, and may be determined based on the first group $G_1$ of base vectors; $g_{i,2}$ may be an $N_{SB} \times 1$-dimensional column vector, may be understood as a second component of the $i^{th}$ base vector, and may be determined based on the second group $G_2$ of base vectors. In this case, each base vector meets $v_i = g_{i,1} \otimes g_{i,2}$, and each base vector may include $N_T \cdot N_{SB}$ elements.

Therefore, the indication information of the M beams may include a position of the first component of each of the M base vectors in the first group of base vectors and a position of the second component of the base vector in the second group of base vectors.

(b) Indication information of amplitude coefficients corresponding to the M beams:

The M amplitude coefficients corresponding to the M beams may correspond to moduli of the M complex number elements having higher powers in the first matrix. The terminal device may send quantized values of the moduli of the M complex number elements to the network device.

In a possible design, the network device and the terminal device may pre-store correspondences between a plurality of amplitude coefficients and a plurality of indexes. The correspondences between the plurality of amplitude coefficients and the plurality of indexes may be referred to as, for example, an amplitude codebook. The terminal device may send, to the network device, indexes of M amplitude coefficients that are in the amplitude codebook and closest to real parts of the M complex number elements, so that the network device determines the M amplitude coefficients based on the M indexes.

In another possible design, the network device and the terminal device may pre-store correspondences between a plurality of amplitude coefficients and a plurality of indexes and correspondences between a plurality of amplitude difference values and the plurality of indexes. The correspondences between the plurality of amplitude coefficients and the plurality of indexes may be referred to as, for example, a first amplitude codebook, and the correspondences between the plurality of amplitude difference values and the plurality of indexes may be referred to as a second amplitude codebook. The terminal device may perform feedback in a different manner, to reduce feedback overheads. For example, an absolute value of a highest amplitude in the M complex number elements may be indicated to the network device. For example, an index of an amplitude coefficient that is in the first amplitude codebook and that is closest to the highest amplitude is sent to the network device. Difference values of amplitudes of the remaining (M−1) complex number elements relative to the highest amplitude are indicated to the network device. For example, indexes of (M−1) difference values that are closest to the amplitudes of the remaining (M−1) complex elements relative to the highest amplitude are sent to the network device. Overheads of bits used to indicate the highest amplitude may be greater than overheads of bits used to indicate each of the remaining (M−1) relative amplitudes. For example, the bit overheads of the highest amplitude are b bits, and the bit overheads of each relative amplitude are c bits, where b>c. The network device may determine, based on different quantities of bits of all fields in the received CSI, codebooks corresponding to indexes carried in the fields.

According to the foregoing methods for indicating the amplitude coefficients corresponding to the M beams, the amplitude of each complex number element may be uniformly quantized by using a bits, or the highest amplitude may be quantized by using b bits, and the relative amplitudes are quantized by using (M−1)c bits. This is not limited in this application.

(c) Indication information of phase coefficients corresponding to the M beams:

The M phase coefficients corresponding to the M beams may be determined based on real parts and imaginary parts of the M complex number elements having higher powers in the first matrix. The terminal device may determine the corresponding M phase coefficients based on the real parts and imaginary parts of the M complex number elements, and send quantized values of the phase coefficients to the network device.

In a possible design, the network device and the terminal device may pre-store correspondences between a plurality of phase coefficients and a plurality of indexes. The correspondences between the plurality of phase coefficients and the plurality of indexes may be referred to as, for example, a phase codebook. The terminal device may send, to the network device, indexes of M phase coefficients that are in the phase codebook and closest to the M phase coefficients corresponding to the M complex number elements, so that the network device determines the M phase coefficients based on the M indexes.

In another possible design, the network device may pre-store correspondences between a plurality of phase coefficients and a plurality of indexes and correspondences between a plurality of phase difference values and a plurality of indexes. The correspondences between the plurality of phase coefficients and the plurality of indexes may be referred to as, for example, a first phase codebook, and the correspondences between the plurality of phase difference values and the plurality of indexes may be referred to as a second phase codebook. The terminal device may perform feedback in a different manner, to reduce feedback overheads. For example, the phase coefficient of the first complex element in the M complex number elements may be indicated to the network device. For example, an index of a phase coefficient that is in the first phase codebook and closest to the phase coefficient of the first complex element is sent to the network device. Difference values of phase coefficients of the remaining (M−1) complex element relative to the phase coefficient of the first complex element are indicated to the network device. For example, indexes of (M−1) difference values that are closest to the difference values of the phase coefficients of the remaining (M−1) complex elements relative to the phase coefficient of the first complex element are sent to the network device. Overheads of bits used to indicate the phase coefficient of the first complex number element may be greater than overheads of bits used to indicate each of the remaining (M−1) difference values. For example, the bit overheads of the phase coefficient of the first complex number element are j bits, and the bit overheads of each difference value are k bits, where j>k.

The network device may determine, based on different quantities of bits of all fields in the received CSI, codebooks corresponding to indexes carried in the fields.

According to the foregoing methods for indicating the phase coefficients corresponding to the M beams, the phase of each complex number element may be uniformly quantized by using 1 bits, or the phase of the first complex number element may be quantized by using j bits, and the relative amplitudes are quantized by using (M−1)k bits. This is not limited in this application.

According to the indication methods listed in (b) and (c), both the amplitude coefficients and the phase coefficients may be uniformly quantized; or the amplitude coefficients may be non-uniformly quantized, and the phase coefficients may be uniformly quantized; or the amplitude coefficients may be uniformly quantized, and the phase coefficients may be non-uniformly quantized; or both the amplitude coefficients and the phase coefficients may be non-uniformly quantized. This is not limited in this application.

It should be understood that the foregoing plurality of specific methods for indicating the M beams, the amplitude coefficients corresponding to the M beams, and the phase coefficients corresponding to the M beams, and the overheads of the bits for quantizing are merely examples for description, and should not constitute any limitation on this application.

It should be further understood that one or more of (a), (b), and (c) may be separately fed back. When two or three items of (a), (b), and (c) need to be fed back, the items may be indicated in a joint coding manner. This is not limited in this application.

In the embodiments of this application, the $N_R$ groups of indication information in the CSI may be used to indicate $N_R$ column vectors, and the $N_R$ columns may constitute a measured value Z. The measured value Z may include the $N_R$ column vectors, and the $N_R$ column vectors may be understood as $N_R$ components of the measured value Z. It may be understood that the $N_R$ components may also be understood as a measured value, namely, a measured value corresponding to one receive antenna or a measured value corresponding to one layer. In the following, the measured value Z and the measured value $y^n$ appear alternately. A person skilled in the art may understand that dimensions of the two values are different, and the measured value $y^n$ may be an $n^{th}$ column vector in the measured value Z.

The $n^{th}$ (where $1 \leq n \leq N_R$, and n is an integer) column in the $N_R$ columns may be represented as $y^n$, and $y^n$ meets:

$$y^n = \alpha \sum_{i=1}^{M} B_i^n P_i^n C_i^n,$$

where $\alpha$ is a normalized coefficient; M is a quantity of base vectors, and the M base vectors are M columns in the Kronecker product of the first group $G_1$ of base vectors and the second group $G_2$ of base vectors; $B_i^n$ is an $i^{th}$ column vector in the M base vectors, and a dimension of $B_i^n$ is $N_T \cdot N_{SB} \times 1$; $P_i^n C_i^n$ is a linear superposition coefficient of $B_i^n$; $P_i^n$ is an amplitude coefficient of $B_i^n$; $C_i^n$ is a phase coefficient of $B_i^n$, where $N_T$ is a quantity of antenna ports for sending the reference signal, $N_{SB}$ is a quantity of frequency domain units included in a frequency domain resource for transmitting the reference signal, $1 \leq i \leq M$, and both i and M are integers.

It should be noted that each of the $N_R$ columns may meet the structure of $$y^n = \alpha \sum_{i=1}^{M} B_i^n P_i^n C_i^n,$$

or have a same dimension. However, for each column vector, one or more of the M base vectors, the M amplitude coefficients, or the M phase coefficients that are used to construct the column vector may be different. Therefore, any two of the $N_R$ columns may be different or may be the same. This is not limited in this application.

Optionally, the measured value may be equivalent to $G_1 \otimes G_2 \times u$, and the measured value $y^n$ may be an $(N_T \cdot N_{SB}) \times 1$-dimensional column vector.

The measured value $y^r$ may be understood as a measured value corresponding to an $r^{th}$ receive antenna or an $r^{th}$ layer. That is, n=r. The $(N_1 \cdot N_2) \times 1$-dimensional column vector u is obtained by converting the first matrix $v_{P,T}'$, and the first matrix $V_{P,T}'$ is a matrix obtained after $V_{P,T}$ is processed. Therefore, it may be considered that the measured value $y_r$ is obtained based on conversion of $V_{P,T}$. The measured value $y^r$, whose dimension is $(N_T \cdot N_{SB}) \times 1$, is further converted into an $N_T \times N_{SB}$-dimensional matrix, and the matrix is a matrix that approximates to the precoding matrix $V_r$.

Optionally, the measured value $y^n$ may be equivalent to a column vector obtained by converting $G_1 V_{P,T}' G_2^T$. Because $G_1 V_{P,T}' G_2^T$ is an $N_1 \times N_2$-dimensional matrix, a dimension of the column vector obtained through conversion is $(N_1 N) \times 1$.

The measured value $y_r$ may be understood as a measured value corresponding to an $r^{th}$ receive antenna or an $r^{th}$ layer. That is, n=r. Because the first matrix $V_{P,T}'$ is a matrix obtained after $V_{P,T}$ is processed, it may be considered that the measured value $y^r$ is obtained based on conversion of $V_{P,T}$. The measured value $y^r$, whose dimension is $(N_T \cdot N_{SB}) \times 1$, is further converted into an $N_T \times N_{SB}$-dimensional matrix, and the matrix is a matrix that approximates to the precoding matrix $V_r$.

Therefore, a dimension of the measured value Z may be $(N_T \cdot N_{SB}) \times N_R$.

It should be understood that the foregoing two possible forms equivalent to the measured value are merely examples for description. In addition, for ease of understanding, specific transformation processes are described above. However, this does not mean that the terminal device performs the foregoing operations, and the terminal device may directly feed back the CSI to the network device to indicate the measured value, so that the network device determines the precoding matrix.

Because the foregoing transformation is described from a perspective of a receive antenna or a layer, transformation processes of a plurality of receive antennas or layers of the terminal device are similar. Therefore, for the plurality of receive antennas or layers of the terminal device, measured values corresponding to the plurality of receive antennas or layers may constitute the measured value Z. A value of r is traversed in [1, N] to obtain the measured value Z.

It should be understood that, in the foregoing embodiments, for ease of description, it is assumed that a rank of the channel matrix is equal to a quantity of receive antennas. However, this is merely an example for description, and should not constitute any limitation on this application. A value of the rank is not limited in this application. For example, the rank may alternatively be an integer value less than the quantity of receive antennas.

Step (vi):

The network device may determine the measured value based on the received CSI.

The network device may obtain, based on each group of indication information in the received CSI, a measured value corresponding to one receive antenna or one layer. A dimension of the measured value may be $(N_T \cdot N_{SB}) \times 1$. Specifically, the network device may determine the M beam vectors based on pre-defined correspondences between a plurality of column vectors in the matrix (namely, $G_1 \otimes G_2$) and a plurality of indexes; or determine the M beam vectors based on pre-defined correspondences between a plurality of column vectors in the first group of base vectors and a plurality of indexes and pre-defined correspondences between a plurality of column vectors in the second group of base vectors and a plurality of indexes. The network device may further determine, based on pre-stored correspondences between a plurality of quantized values and a plurality of amplitude coefficients and/or pre-stored correspondences between the plurality of quantized values and a plurality of phase coefficients, M amplitude coefficients corresponding to the M beams and/or M phase coefficients corresponding to the M beams. Therefore, the measured value $y^r$ may be obtained based on a group of indication information in the CSI.

The network device may further convert the measured value $y^r$ into an $N_T \times N_{SB}$-dimensional matrix. For example, the network device may use an $(N_T \cdot N_{SB} - N_T + 1)_{th}$ row to an $(N_T \cdot N_{SB})_{th}$ row of the measured value $y_r$ as an $N_{SB}^{th}$ column of a second matrix, uses an $(N_T \cdot N_{SB} - 2N_T + 1)_{th}$ row to an $(N_T \cdot N_{SB} - N_T)_{th}$ throw of the measured value $y^r$ as the $N_{SB}^{th}$ column of the second matrix, and so on. For ease of differentiation and description, an $N_T \times N_{SB}$-dimensional matrix restored from the measured value $y^r$ may be denoted as a third matrix $V_{P,T}'''$.

It may be understood that the third matrix $V_{P,T}'''$ is the same as or close to the first matrix $V_{P,T}'$ in step (iii), in other words, is the same as or close to the precoding matrix $V_r$ obtained by the terminal device through measurement based on the reference signal. Therefore, the third matrix $V_{P,T}'''$ is a precoding matrix that is determined by the network device based on the CSI and that corresponds to one receive antenna or one layer.

Further, the network device may obtain a measured value Z' by traversing a value of n in [1, $N_R$]. A dimension of the measured value Z' may be $(N_T \cdot N_{SB}) \times N_R$. $N_R$ $N_T \times N_{SB}$-dimensional matrices may be obtained by performing the foregoing operations on each column in the measured value Z'. When a quantity of rows remains unchanged, an $N_T \times (N_R \cdot N_{SB})$-dimensional matrix may be obtained by sequentially concatenating the $N_R$ $N_T \times N_{SB}$-dimensional matrices. The $N_T \times (N_R \cdot N_{SB})$-dimensional matrix may be understood as a precoding matrix corresponding to one antenna port group.

It may be understood that the measured value Z' obtained by the network device through calculation based on the CSI may be the same as or close to the measured value Z obtained after the terminal device performs the foregoing transformation on the precoding matrix $V_r$. In other words, the precoding matrix determined by the network device based on the CSI may be the same as or close to the precoding matrix determined based on the reference signal.

Step (vii):

Optionally, the network device may further perform inverse transformation of IDFT and inverse transformation of DFT on the $N_R$ $N_T \times N_{SB}$-dimensional matrices obtained by converting the measured value.

For example, the network device performs inverse transformation of IDFT and inverse transformation of DFT on the third matrix $V_{P,T}'''$ obtained by converting the $r^{th}$ column in the measured value Z', to obtain $V'=(G_1^*)^{-1} V_{P,T}'''((G_2^*)^T)^{-1}$. $N_R$ $N_T \times N_{SB}$-dimensional matrices may be obtained after inverse transformation of IDFT and inverse transformation of DFT are performed based on the $N_R$ $N_T \times N_{SB}$-dimensional matrices obtained through conversion on each column in the measured value Z'. When a quantity of rows remains unchanged, the $N_R$ $N_T \times N_{SB}$-dimensional matrices are sequentially concatenated to obtain an $N_T \times (N_R \cdot N_{SB})$-dimensional matrix. The $N_T \times (N_R \cdot N_{SB})$-dimensional matrix may be understood as a precoding matrix corresponding to one antenna port group.

Further, if a plurality of antenna port groups are considered, for example, a quantity of antenna port groups is p, the terminal device and the network device may separately perform the foregoing operations on each antenna port group, to obtain p $N_T \times (N_R \cdot N_{SB})$-dimensional matrices. Then, on a premise that a quantity of columns remains unchanged, the obtained $N_T \times (N_R \cdot N_{SB})$-dimensional matrices are sequentially concatenated to obtain a $(p \cdot N_T) \times (N_R \cdot N_{SB})$-dimensional matrix. The $(p \cdot N_T) \times (N_R \cdot N_{SB})$-dimensional matrix is a precoding matrix corresponding to the p antenna port groups.

It should be understood that if the terminal device performs channel measurement and feedback based on a plurality of antenna port groups, the terminal device may feed back, to the network device in a same indication manner, a plurality of groups of indication information that correspond to the plurality of antenna port groups. For example, the M beams, the M amplitude coefficients corresponding to the M beams, and the M phase coefficients corresponding to the M beams may be indicated based on different antenna port groups and in the foregoing listed manner; or, based on one of the antenna port groups (which is denoted as, for example, an antenna port group #1), M beams corresponding to the antenna port group #1, M amplitude coefficients corresponding to the M beams, and M phase coefficients corresponding to the M beams may be indicated in the foregoing listed manner, and based on remaining one or more antenna port groups (which is denoted as, for example, an antenna port group #2), M beams corresponding to the antenna port group #2, difference values between M amplitude coefficients corresponding to the M beams and the M amplitude coefficients of the antenna port group #1, and difference values between M phase coefficients corresponding to the M beams and the M phase coefficients of the antenna port group #1 may be fed back. Therefore, the CSI fed back based on the plurality of antenna port groups may include the $N_R$ groups of indication information that correspond to the plurality of antenna port groups, and the $N_R$ groups of indication information that correspond to the plurality of antenna port groups may be used to indicate a measured value set including a plurality of measured values.

It should be further understood that, based on the plurality of antenna port groups, the terminal device may give a feedback for one or more of the M beams corresponding to each antenna port group, the M amplitude coefficients corresponding to the M beams, and the M phase coefficients corresponding to the M beams. This is not limited in this application.

According to the foregoing method, the terminal device may obtain a to-be-fed-back measured value by performing fast operations of FFT and IFFT, and send a quantized value of the measured value to the network device by using CSI. The network device may determine a precoding matrix based on the CSI and by performing inverse operations of FFT and IFFT. In a prior-art process, a terminal device traverses all codewords in a codebook to determine a precoding matrix. Therefore, complexity of calculation by the terminal device may be significantly reduced. This helps reduce power consumption of the terminal device. In addition, the CSI is fed back, so that the network device determines the proper precoding matrix to precode the to-be-sent signal. This improves data transmission reliability. In other words, the data transmission reliability is ensured, channel measurement complexity is significantly reduced, and power consumption is reduced. Therefore, this helps improve performance of an entire communications system.

B: Manner 2

In the manner 2, step (i) to step (vx) may be included. Step (i) to step (v) may be operations performed by the terminal device, and step (vi) to step (vx) may be operations performed by the network device.

Step (i):

The terminal device may perform IDFT on the precoding matrix based on the first group of base vectors, to obtain an $N_1 \times N_{SB}$-dimensional matrix.

Step (ii):

The terminal device may perform, based on the second group of base vectors, DFT on a result obtained through IDFT, to obtain an $N_1 \times N_2$-dimensional matrix.

A matrix $V_{P,T} G_1^* V (G_2^*)^T$ may be obtained by performing step (i) and step (ii).

For ease of differentiation and description, the $N_1 \times N_2$-dimensional matrix $V_{P,T}$ may be denoted as a fourth matrix.

It should be understood that specific processes of step (i) and step (ii) in the manner 2 are the same as specific processes of step (i) and step (ii) in the manner 1. For brevity, details are not described herein again.

Step (iii):

The terminal device converts the matrix obtained through DFT into a column vector.

For example, elements in the second column to an $N_{SB}^{th}$ column in the $N_1 \times N_2$-dimensional matrix $V_{P,T}$ obtained through IDFT may be sequentially concatenated below the elements in the first column, to obtain an $N_1 \cdot N_2$-2-dimensional column vector. For ease of differentiation and description, the $N_1 \cdot N_2 \times 1$-dimensional column vector is denoted as x. The first element to an $N_1^{th}$ element in the column vector may correspond to the first column of the matrix, an $(N_1+1)^{th}$ element to the $(2N_1)^{th}$ element in the column vector may correspond to the second column of the matrix, and so on.

Step (iv):

The terminal device may perform compression transformation on the $N_1 \cdot N_2 \times 1$-dimensional column vector, to obtain an $M \times 1$-dimensional column vector.

For example, compression transformation is performed on the $N_1 \cdot N_2 \times 1$-dimensional column vector x based on a pre-obtained compression transformation matrix ψ. For example, the column vector x is left multiplied by the compression transformation matrix ψ to obtain ψx. A dimension of the compression transformation matrix may be, for example, $M \times (N_1 \cdot N_2)$. The $(N_1 \cdot N_2) \times 1$-dimensional column vector x may be left multiplied by the compression transformation matrix ψ, to obtain an $M \times 1$-dimensional column vector. The $M \times 1$-dimensional column vector obtained through compression may be understood as a measured value y' obtained by the terminal device through measurement based on the reference signal.

The compression transformation matrix may be pre-defined, for example, defined in a protocol, or indicated by the network device. This is not limited in this application.

Step (v):

The terminal device may send CSI to the network device. The CSI is used to indicate the measured value.

After the foregoing transformation, the terminal device may feed back, to the network device, quantized values of real parts and imaginary parts of M complex elements in the measured value $y^r$ whose dimension is M×1, so that the network device determines the measured value based on the received CSI.

For example, each complex element is quantized by using a pre-defined quantity of bits. For example, 20 bits are used to quantize a complex element: 10 bits are used for a real part, and 10 bits are used for an imaginary part. In the 10 bits, the first 6 bits may be used to quantize an integral part, and the last 4 bits may be used to quantize a fractional part.

Therefore, the CSI sent by the terminal device to the network device may carry the quantized values of the M complex number elements. The terminal device may separately encode the quantized values of the M complex elements, and feed back, to the network device, values obtained after the encoding; or may perform joint coding on the quantized values of the M complex elements, and feed back, to the network device, values obtained after the joint coding. This is not limited in this application.

It should be noted that the terminal device and the network device pre-store correspondences between a plurality of quantized values and a plurality of values. The terminal device may quantize each complex element based on the correspondences, and the network device may determine each complex element based on the correspondences and the quantized values.

Because the foregoing transformation is described from a perspective of a receive antenna or a layer, transformation processes of a plurality of receive antennas or layers of the terminal device are similar. Therefore, for a plurality of receive antennas or a plurality of layers of the terminal device, the measured value may be denoted as Z, and Z may include a plurality of columns. As described above, a value of a quantity of receive antennas or a value of a rank may be $N_R$. In this case, each column vector in the measured value Z corresponds to a measured value $y^n$ (where $1 \leq n \leq N_R$, and n is a positive integer). A quantity of columns included in the measured value Z is a quantity of measured value components included in the measured value Z. In other words, a value of n is traversed in $[1, N_R]$, and n is a positive integer.

Therefore, a dimension of the measured value Z may be M×$N_R$.

Step (vi):

The network device may determine the measured value based on the CSI.

The network device may determine M complex number elements based on the quantized values in the CSI and the pre-stored correspondences between the plurality of quantized values and the plurality of values, to obtain an M×1-dimensional column vector, namely, a measured value $y^{r_1}$. It may be understood that the measured value $y^{r_1}$ determined by the network device based on the CSI may be the same as or close to the measured value $y^r$ obtained by the terminal device based on transformation of the precoding matrix.

Step (vii):

The network device may restore the measured value to an $(N_1 \cdot N_2) \times 1$-dimensional column vector based on the compression transformation matrix.

The network device may convert the M×1-dimensional column vector into the $(N_1 \cdot N_2) \times 1$-dimensional column vector through inverse transformation of compression transform. For ease of differentiation and description, the $(N_1 \cdot N_2) \times 1$-dimensional column vector obtained through inverse transformation of compression transformation is denoted as x'. It may be understood that the column vector x' obtained by the network device through inverse transformation of the measured value $y^{r_1}$ may be the same as or close to the column vector x obtained by the terminal device based on transformation of the precoding matrix $V_r$.

Step (viii):

The network device may further convert the M×1-dimensional column vector into an $N_1 \times N_2$-dimensional matrix.

The network device may further convert the M×1-dimensional column vector x' into the $N_1 \times N_2$-dimensional matrix $V_{P,T}'$. For ease of differentiation and description, the $N_1 \times N_2$-dimensional matrix $V_{P,T}'$ may be denoted as a fifth matrix. It may be understood that the fifth matrix $V_{P,T}'$ is obtained based on conversion of the measured value $y^{r_1}$ determined based on the CSI fed back by the terminal device. Therefore, the fifth matrix $V_{P,T}'$ is the same as or close to the fourth matrix $V_{P,T}$ obtained by the terminal device based on conversion of the precoding matrix $V_r$.

It should be understood that a specific process in which the network device converts the M×1-dimensional column vector x' into the fifth matrix, whose dimension is $N_1 \times N_2$, is similar to the specific process that is in step (vii) in the manner 1 and in which the network device converts the column vector into the third matrix. For brevity, details are not described herein again.

Step (vx):

The network device may determine the precoding matrix based on the fifth matrix.

The network device may perform IDFT and DFT on the fifth matrix $V_{P,T}'$ based on the first group of base vectors and the second group of base vectors, to obtain the precoding matrix $V_r'$, namely, $V_r' = G_1 V_{P,T}' (G_2)^T$. It has been noted above that the fifth matrix $V_{P,T}'$ is the same as or close to the fourth matrix $V_{P,T}$. Therefore, $V_r'$ may be approximately equal to $G_1 V_{P,T} (G_2)^T$. $V_{P,T} = G_1^* V (G_2)^T$ may be substituted $G_1 V_{P,T} (G_2)^T$, so that V is approximately equal to $G_1 G_1^* V_r (G_2^*)^T (G_2)^T$. After simplification, V may be approximately equal to $V_r$. Therefore, the precoding matrix r determined by the network device based on the fifth matrix is the same as or close to the precoding matrix $V_r$ determined by the terminal device based on the reference signal.

Further, the network device may obtain the measured value Z' by traversing a value of n in $[1, N_R]$. A dimension of the measured value Z' may be M×$N_R$. $N_R N_T \times N_{SB}$-dimensional precoding matrices may be obtained by performing the foregoing operations on each column in the measured value Z'.

Further, if a plurality of antenna port groups are considered, for example, a quantity of antenna port groups is p, the terminal device and the network device may separately perform the foregoing operations on each antenna port group, and then on a premise that a quantity of columns remains unchanged, sequentially concatenate the obtained $N_T \times (N_R \cdot N_{SB})$-dimensional matrices to obtain a $(p \cdot N_T) \times (N_R \cdot N_{SB})$-dimensional matrix.

According to the foregoing technical solution, the terminal device may process the channel matrix or the precoding matrix based on the first group of base vectors and the second group of base vectors, and feed back the processed result to the network device by using the CSI. The network device may determine the measured value based on the CSI, to further determine the precoding matrix. The terminal device may obtain the to-be-fed-back CSI through fast computation of the FFT and the IFFT. However, in a prior-art process, a terminal device traverses all codewords in a codebook to determine a precoding matrix. Therefore, complexity of calculation by the terminal device may be significantly reduced. This helps reduce power consumption of the terminal device. In addition, the CSI is fed back, so that the network device determines the proper precoding matrix to precode the to-be-sent signal. This improves data transmission reliability. In other words, the data transmission reliability is ensured, channel measurement complexity is significantly reduced, and power consumption is reduced. Therefore, this helps improve performance of an entire communications system.

C: Manner 3

In the manner 3, step (i) to step (vi) may be included. Step (i) to step (v) may be operations performed by the terminal device, and step (vi) may be an operation performed by the network device.

Step (i):

The terminal device may perform IDFT on the precoding matrix based on the first group of base vectors, to obtain an $N_1 \times N_{SB}$-dimensional matrix.

For example, the terminal device may left multiply the precoding matrix $V_r$ by a conjugate transpose of the first group $G_1$ of base vectors to obtain the $N_1 \times N_{SB}$-dimensional matrix $V_P$, where $V_P = G_1^* V_r$.

It should be understood that a specific process of step (i) in the manner 3 is the same as the specific process of step (i) in the manner 1. For brevity, details are not described herein again.

Step (ii):

The terminal device may determine $M_B$ beam vectors based on the matrix obtained through IDFT.

Specifically, the terminal device may determine, based on pre-obtained $M_B$ (where $1 \leq M_B \leq N_1$, and $M_B$ is a positive integer), $M_B$ rows having higher powers in the $N_1 \times N_{SB}$-dimensional matrix obtained through IDFT. For example, after calculating a sum of powers of elements in each row of the matrix obtained through IDFT, the terminal device arranges the rows in descending order of the sums, finds $M_B$ rows having higher power values, remains the elements in the $M_B$ rows unchanged, and sets elements in a remaining row to zero. A dimension of a matrix obtained after the foregoing processing is still $N_1 \times N_{SB}$. For ease of differentiation and description, the matrix obtained after the processing is denoted as a sixth matrix $U_P$. Positions of $M_B$ rows in which non-zero elements in the sixth matrix are located may be used to indicate beam vectors of $M_B$ beams having higher powers in beam domain-frequency domain. To be specific, the positions of the $M_B$ rows in the sixth matrix may correspond to positions of the $M_B$ beam vectors in the $N_1$ columns of the first group $G_1$ of base vectors whose dimension is $N_T \times N_1$.

It should be understood that a specific method for determining the $M_B$ rows having higher powers in the $N_1 \times N_{SB}$-dimensional matrix is merely a possible implementation, and should not constitute any limitation on this application. A specific method for determining the $M_B$ rows having higher powers is not limited in this application.

A value of $M_B$ may be pre-defined, for example, defined in a protocol, or indicated by the network device. This is not limited in this application.

If the value of $M_B$ is indicated by the network device, optionally, the method further includes: The terminal device receives indication information of $M_B$. Correspondingly, the network device sends the indication information of $M_B$.

Optionally, the indication information of $M_B$ may be carried in higher layer signaling, or may be carried in physical layer signaling. By way of example and not limitation, the higher layer signaling includes, for example, an RRC message or a MAC CE. By way of example and not limitation, the physical layer signaling includes, for example, DCI.

Step (iii):

The terminal device may perform DFT on the sixth matrix to obtain an $N_1 \times N_2$-dimensional matrix.

For example, the terminal device may right multiply the sixth matrix $U_P$ by a conjugate transpose of the second group $G_2$ of base vectors to obtain the $N_1 \times N_2$-dimensional matrix $U_{P,T}$, where $U_{P,T} = U_P (G_2)^T$.

It should be understood that a specific process of step (iii) in the manner 3 is similar to the specific process of step (ii) in the manner 1, but the dimensions of the matrices are different. For brevity, details are not described herein again.

Step (iv):

The terminal device may determine $M_T$ beam vectors based on the matrix obtained through DFT.

Specifically, the terminal device may calculate, based on pre-obtained $M_T$ (where $1 \leq M_T \leq N_2$ and $M_T$ is a positive integer), a sum of powers of elements in each column of the $N_1 \times N_2$-dimensional matrix obtained through DFT, and then arrange the columns in descending order of the sums, find $M_T$ columns having higher power values, remain the elements in the $M_T$ columns unchanged, and set elements in a remaining column to zero. A dimension of a matrix obtained after the foregoing processing is still $N_1 \times N_2$. For ease of differentiation and description, the matrix obtained after the processing is denoted as a seventh matrix $U_{P,T}'$. Positions of $M_T$ columns in which non-zero elements in the seventh matrix are located may be used to indicate beam vectors of $M_T$ beams having higher powers in beam domain-time domain. To be specific, the positions of the $M_T$ columns in the seventh matrix may correspond to positions of the $M_T$ beam vectors in the $N_2$ columns of the second group $G_2$ of base vectors whose dimension is $N_{SB} \times N_2$.

It should be understood that a specific method for determining the $M_T$ columns having higher powers in the $N_1 \times N_2$-dimensional matrix is merely a possible implementation, and should not constitute any limitation on this application. A specific method for determining the $M_T$ columns having higher powers is not limited in this application.

A value of $M_T$ may be pre-defined, for example, defined in a protocol, or indicated by the network device. This is not limited in this application.

If the value of $M_T$ is indicated by the network device, optionally, the method further includes: The network device sends indication information of $M_T$. Correspondingly, the terminal device receives the indication information of $M_T$.

Optionally, the indication information of $M_T$ may be carried in higher layer signaling, or may be carried in physical layer signaling. By way of example and not limitation, the higher layer signaling includes, for example, an RRC message or a MAC CE. By way of example and not limitation, the physical layer signaling includes, for example, DCI.

Optionally, the indication information of $M_B$ and the indication information of $M_T$ may be carried in same signaling, or carried in different signaling. This is not limited in this application.

Step (v):

The terminal device sends CSI. The CSI may be used to indicate the measured value.

When performing measurement and feedback based on $N_R$ receive antennas or $N_R$ layers, the terminal device may send $N_R$ groups of indication information to the network device. Optionally, the CSI may include $N_R$ groups of indication information, and each group of indication information includes one or more of the following items:

(d) indication information of $M_B$ first base vectors;

(e) indication information of $M_T$ second base vectors;

(f) indication information of M amplitude coefficients corresponding to the $M_B$ first base vectors and the $M_T$ second base vectors; or (g) indication information of M phase coefficients corresponding to the $M_B$ first base vectors and the $M_T$ second base vectors.

In some cases, the network device and the terminal device may pre-define any one or more of the four items (d) to (g), and the terminal device needs to feed back only remaining one or more items. For example, if the network device may pre-define M beams, to be specific, pre-define the $M_B$ first base vectors and the $M_T$ second base vectors, terminal device may feed back only the indication information of the amplitude coefficients corresponding to the M beams and the indication information of the phase coefficients corresponding to the M beams. For another example, if the network device may pre-define M beams and amplitude coefficients of the M beams, the terminal device may feed back only phase coefficients of the M beams. For brevity, examples are not listed herein one by one.

The following separately describes in detail specific manners in which the terminal device indicates the four items (d) to (g).

(d) Indication information of $M_B$ first base vectors:

The indication information of the $M_B$ first base vectors may be information about the positions of the $M_B$ rows in the sixth matrix whose dimension is $N_1 \times N_{SB}$. The positions of the $M_B$ rows in the sixth matrix whose dimension is $N_1 \times N_{SB}$ correspond to the positions of the $M_B$ beam vectors in the $N_1$ columns of the first group of base vectors.

In a possible design, the positions of the $M_B$ rows may be indicated in a joint coding manner. Therefore, overheads of $$\log_2 \binom{N_1}{M_B}$$

bits may be required. In another possible design, $M_B$ row vectors having higher powers in $N_1$ row vectors may be indicated by using a bitmap. Each bit in the bitmap may correspond to one of the $N_1$ row vectors. Therefore, overheads of $N_1$ bits are required.

It should be understood that the foregoing listed specific methods for indicating the $M_B$ first base vectors are merely several possible implementations, and should not constitute any limitation on this application. This application does not exclude another manner of indicating the positions of the $M_B$ first base vectors in the sixth matrix whose dimension is $N_1 \times N_{SB}$.

(e) Indication information of $M_T$ second base vectors:

The indication information of the $M_T$ second base vectors may be information about the positions of the $M_T$ column vectors in the seventh matrix whose dimension is $N_1 \times N_2$. The positions of the $M_T$ column vectors in the seventh matrix whose dimension is $N_1 \times N_2$ correspond to the positions of the $M_T$ beam vectors in the $N_2$ columns of the second group of base vectors.

In a possible design, the positions of the $M_T$ column vectors may be indicated in a joint coding manner. Therefore, overheads of $$\log_2 \binom{N_2}{M_T}$$

bits may be required. In another possible design, $M_T$ column vectors having higher powers in $N_2$ column vectors may be indicated by using a bitmap. Each bit in the bitmap may correspond to one of the $N_2$ column vectors. Therefore, overheads of $N_2$ bits are required.

It should be understood that the foregoing listed specific methods for indicating the $M_T$ second base vectors are merely several possible implementations, and should not constitute any limitation on this application. This application does not exclude another manner of indicating the positions of the $M_T$ second base vectors in the seventh matrix whose dimension is $N_1 \times N_2$.

The $M_B$ first base vectors and the $M_T$ second base vectors may be obtained by indicating the $M_B$ first base vectors and the $M_T$ second base vectors, and a Kronecker product of the $M_B$ first base vectors and the $M_T$ second base vectors is beam vectors of the M beams.

(f) M amplitude coefficients corresponding to the M beam vectors:

The M amplitude coefficients corresponding to the M beam vectors may correspond to amplitude values of $M_B \times M_T$ non-zero elements in the seventh matrix. In a possible implementation, the $M_B \times M_T$ non-zero elements in the seventh matrix may be extracted to constitute an $M_B \times M_T$-dimensional matrix of the non-zero elements, and relative positions of the non-zero elements remain unchanged. In this case, a row and column of each element in the $M_B \times M_T$-dimensional matrix may respectively correspond to subscripts b and t in $P_{b,t}$.

(g) Indication information of phase coefficients corresponding to the $M_B$ first base vectors and phase coefficients corresponding to the $M_T$ second base vectors:

The M phase coefficients corresponding to the M beam vectors may be determined based on real parts and imaginary parts of the $M_B \times M_T$ non-zero elements in the seventh matrix. In a possible implementation, the $M_B \times M_T$ non-zero elements in the seventh matrix may be extracted to constitute an $M_B \times M_T$-dimensional matrix of the non-zero elements, and relative positions of the non-zero elements remain unchanged. In this case, a row and column of each element in the $M_B \times M_T$-dimensional matrix may respectively correspond to subscripts b and t in $C_{b,t}$.

It should be further understood that one or more of (d), (e), (f), and (g) may be separately fed back. When two or more of (d), (e), (f), and (g) need to be fed back, any two or more items may be indicated in a joint coding manner. This is not limited in this application.

The foregoing describes a group of indication information in the CSI from a perspective of one receive antenna or one layer. For a plurality of receive antennas or layers of the terminal device, methods for indicating measured values by using a plurality of groups of indication information in the CSI are similar.

The measured value Z includes the $N_R$ column vectors that one-to-one correspond to the $N_R$ groups of indication information. A quantity $N_R$ of columns included in the measured value Z is a quantity of measured values indicated by the measured value Z. In other words, the value of n may be traversed in [1, $N_R$], and n is a positive integer.

In the manner 3, the measured value may be represented in at least two forms listed below: a form 1 and a form 2. The following separately describes in detail a specific process of determining the measured value based on the CSI with reference to the form 1 and the form 2.

Form 1:

The measured value Z may include $N_R$ measured values, each column vector in the measured value Z corresponds to one measured value, an $n^{th}$ column in the $N_R$ columns may be represented as $y_n$, and $y_n$ meets:

$$y^n = \alpha \sum_{i=1}^{M} B_i^n P_i^n C_i^n,$$

where $\alpha$ is a normalized coefficient; M is a quantity of base vectors, and the M base vectors are M columns in the Kronecker product of the first group $G_1$ of base vectors and the second group $G_2$ of base vectors; $B_i^n$ is an $i^{th}$ column vector in the M base vectors corresponding to the $n^{th}$ column, and a dimension of $B_i^n$ is $N_T \cdot N_{SB} \times 1$; $P_i^n C_i^n$ is a linear superposition coefficient of $B_i^n$; $P_i^n$ is an amplitude coefficient of $B_i^n$; $C_i^n$ is a phase coefficient of $B_i^n$.

In the form 1, M meets $M = M_B \cdot M_T$. Therefore, as long as the terminal device pre-obtains any two of values of M, $M_B$, and $M_T$, the terminal device can determine the other value. In other words, at least two of the values of M, $M_B$, and $M_T$ may be defined in a protocol, or the network device may send indication information of only at least two of M, $M_B$, and $M_T$.

Optionally, the measured value may be equivalent to $G_1 \otimes G_2 \times u$.

u is an $(N_1 \cdot N_2) \times 1$-dimensional column vector obtained by converting the seventh matrix whose dimension is $N_1 \times N_2$. Specifically, if the second column to an $(N_2)^{th}$ column in the seventh matrix are sequentially concatenated below the elements in the first column, the $(N_1 \cdot N_2) \times 1$-dimensional column vector u may be obtained. The first element to an $N_1^{th}$ element in the column vector u may correspond to the first column of the matrix, an $(N_1+1)^{th}$ element to the $(2N_1)^{th}$ element in the column vector may correspond to the second column of the matrix, and so on.

If the $(N_1 \cdot N_2) \times 1$-dimensional column vector u is left multiplied by the Kronecker product $G_1 \otimes G_2$ of the first group $G_1$ of base vectors and the second group $G_2$ of base vectors, that is, $G_1 \otimes G_2 \times u$, an $(N_T \cdot N_{SB}) \times 1$-dimensional column vector is obtained. The $(N_T \cdot N_{SB}) \times 1$-dimensional column vector may be understood as the measured value $y^r$ corresponding to the $r^{th}$ receive antenna or the $r^{th}$ layer.

Optionally, the measured value may be equivalent to a column vector obtained by converting $G_1 U_{P,T}^{'} G_2^T$.

If IDFT and DFT are performed, by using the first group of base vectors and the second group of base vectors, on the seventh matrix $U_{P,T}^{''}$ whose dimension is $N_1 \times N_2$, to obtain a matrix, for example, $U_{P,T}^{''}$, where $U_{P,T}^{''} = G_1 U_{P,T} G_2^T$. A dimension of $U_{P,T}^{''}$ is $N_T \times N_{SB}$. $U_{P,T}^{''}$ obtained by converting and is a matrix obtained after processing $U_{P,T}$, and $U_{P,T}$ is obtained after IDFT and DFT are performed based on the precoding matrix $V_r$. Therefore, the matrix $U_{P,T}^{''}$ may be understood as a matrix that approximates to the precoding matrix $V_r$.

If the $N_T \times N_{SB}$-dimensional matrix is further converted into an $(N_T \cdot N_{SB}) \times 1$-dimensional column vector, for a specific method for converting the $N_T \times N_{SB}$-dimensional matrix $U_{P,T}^{''}$ into the $(N_T \cdot N_{SB}) \times 1$-dimensional column vector, refer to step (iv) in the manner 1. For brevity, details are not described herein again. The $(N_T \cdot N_{SB}) \times 1$-dimensional column vector is the measured value $y^r$ corresponding to the $r^{th}$ receive antenna or the measured value $y^r$ corresponding to or the $r^{th}$ layer. In other words, the terminal device feeds back, to the network device by using the column vector, the matrix that approximates the precoding matrix.

It should be understood that the foregoing two possible forms equivalent to the measured value are merely examples for description. For ease of understanding, the specific transformation process is described above. However, this does not mean that the terminal device performs the foregoing operations, and the terminal device may directly feed back the CSI to the network device to indicate the measured value, so that the network device determines the precoding matrix.

The foregoing describes a group of indication information in the CSI from a perspective of one receive antenna or one layer. For a plurality of receive antennas or layers of the terminal device, methods for indicating measured values by using a plurality of groups of indication information in the CSI are similar.

The measured value Z includes the $N_R$ column vectors that one-to-one correspond to the $N_R$ groups of indication information. A quantity $N_R$ of columns included in the measured value Z is a quantity of measured values indicated by the measured value Z. In other words, the value of n may be traversed in [1, $N_R$], and n is a positive integer.

Therefore, a dimension of the measured value Z is $(N_T \cdot N_{SB}) \times N_R$.

Form 2:

In the form 2, the $N_R$ groups of indication information in the CSI may be used to indicate $N_R$ $N_T \times N_{SB}$-dimensional matrices Y The $N_R$ matrices may constitute a measured value Z. The measured value includes the $N_R$ matrices, and the $N_R$ matrices may be understood as $N_R$ components of the measured value Z. It may be understood that the $N_R$ components may also be understood as one measured value, namely, a measured value corresponding to one receive antenna or a measured value corresponding to one layer. In the following, the measured value Z and the measured value $Y^n$ appear alternately. A person skilled in the art may understand that dimensions of the two values are different, and the measured value $Y^n$ may be an $n^{th}$ column vector in the measured value Z.

Actually, the measured value Z may be obtained after the $N_R$ $N_T \times N_{SB}$-dimensional matrices are concatenated while a quantity of rows does not change, and a dimension of the measured value Z obtained through concatenating may be $N_T \times (N_R \cdot N_{SB})$.

An $n^{th}$ matrix $Y^n$ of the R matrices meets:

$$Y^n = \beta \sum_{b=1}^{M_B} \sum_{t=1}^{M_T} E_b^n (F_t^n)^T P_{b,t}^n C_{b,t}^n,$$

$\beta$ is a normalized coefficient; $M_B$ is a quantity of first base vectors, $M_T$ is a quantity of second base vectors, the $M_B$ first base vectors are $M_B$ columns in the first group of base vectors, and the $M_T$ second base vectors are $M_T$ columns in the second group of base vectors; $E_b^n$ is a $b^{th}$ first base vector in the $M_B$ first base vectors corresponding to the $n^{th}$ matrix, and a dimension of $E_b^n$ is $N_T \times 1$; $F_t^n$ is a $t^{th}$ second base vector in the $M_T$ second base vectors corresponding to the $n^{th}$ matrix, and a dimension of F is $N_{SB} \times 1$; $P_{b,t}^n C_{b,t}^n$ is a linear superposition coefficient; $P_{b,t}^n$ is an amplitude coefficient; $C_{b,t}^n$ is a phase coefficient, where $1 \le b \le M_B$, $1 \le t \le M_T$, and b, t, $M_B$, and $M_T$ are all positive integers.

In the form 2, $M_B$ and $M_T$ meet $M_B \cdot M_T = M$. Therefore, as long as the terminal device pre-obtains any two of values of M, $M_B$, and $M_T$, the terminal device can determine the other value. In other words, at least two of the values of M, $M_B$, and $M_T$ may be defined in a protocol, or the network device may send indication information of only at least two of M, $M_B$, and $M_T$.

Optionally, the measured value may be equivalent to $G_1 U_{P,T}' G_2^T$.

If IDFT and DFT are performed, by using the first group of base vectors and the second group of base vectors, on the seventh matrix $U_{P,T}'$ whose dimension is $N_1 N_2$, to obtain, for example, $U_{P,T}''$, where $U_{P,T}'' = G_1 U_{P,T}' G_2$. A dimension of $U_{P,T}''$ is $N_T \times N_{SB}$. $U_{P,T}''$ is obtained by converting $U_{P,T}'$, $U_{P,T}'$ is a matrix obtained after processing $U_{P,T}$ is processed, and $U_{P,T}$ is obtained through IDFT and DFT based on the precoding matrix $V_r$. Therefore, the matrix $U_{P,T}''$ may be understood as a matrix that approximates to the precoding matrix $V_r$. The matrix $U_{P,T}''$ may also be understood as the measured value Y''' corresponding to one transmit antenna port group and corresponding to $N_r$ receive antennas or $N_r$ layers.

It should be understood that the foregoing possible forms equivalent to the measured value are merely examples for description. For ease of understanding, the specific transformation process is described above. However, this does not mean that the terminal device performs the foregoing operations, and the terminal device may directly feed back CSI to the network device to indicate the measured value, so that the network device determines the precoding matrix.

Further, if a plurality of transmit antenna port groups are considered, for example, a quantity of the antenna port groups is p, the terminal device may perform the operations in the step (i) to step (v) on an ideal precoding matrix corresponding to each antenna port group, to obtain p measured values Z corresponding to the p antenna port groups. Alternatively, the terminal device may select an antenna port group from the p antenna port groups, perform the operations in step (i) and step (ii) on a precoding matrix corresponding to the antenna port group, to obtain $M_B$ rows having higher powers, retain elements in the $M_B$ rows, and set elements in remaining ($N_1 - M_B$) rows to zero. The terminal device retains elements in $M_B$ rows that are in each of remaining (p−1) antenna port groups and that have same positions as those of the $M_B$ rows, and sets elements in other rows to zero. In this way, p $N_1 \times N_{SB}$-dimensional matrices may be obtained, and then the p measured values Z corresponding to the p antenna port groups may be obtained after operations in step (iii) to step (v) are performed.

Therefore, the CSI fed back based on the plurality of antenna port groups may include the $N_R$ groups of indication information that correspond to the plurality of antenna port groups, and the $N_R$ groups of indication information that correspond to the plurality of antenna port groups may be used to indicate a measured value set including a plurality of measured values. The measured value set may be represented by using a matrix obtained after one or more measured values are concatenated. A quantity of rows of the matrix may be the same as a quantity of rows of each measured value, and a quantity of columns may be a sum of quantities of columns of the measured value.

It should be understood that the foregoing listed methods for processing the precoding matrices corresponding to the plurality of antenna port groups are only several possible implementations, and should not constitute any limitation on this application.

Step (vi):

The network device may determine the measured value based on the received CSI.

Specifically, the network device may determine, based on the received CSI, the measured value in the form 1 or the form 2.

If the network device determines the measured value in the form 1, the network device may obtain, based on each group of indication information in the received CSI, a measured value y''' corresponding to one receive antenna or one layer. A dimension of the measured value y''' may be $(N_T \cdot N_{SB}) \times 1$. The measured value y''' determined by the network device based on the CSI may be the same as or close to the measured value y'' obtained by the terminal device through processing based on the precoding matrix. A specific process in which the network device determines the measured value y''' based on the CSI has been described in detail in step (vii) in the manner 1. For brevity, details are not described herein again. The network device may further convert the measured value y''' into an $N_T \times N_{SB}$-dimensional matrix. A specific process in which the network device converts the $(N_T \cdot N_{SB}) \times 1$-dimensional measured value into the $N_T \times N_{SB}$-dimensional matrix has been described in detail in step (vii) in the manner 1. For brevity, details are not described herein again. The $N_T \times N_{SB}$-dimensional matrix obtained by converting the measured value y''' is the same as or close to the precoding matrix $V_r$ obtained by the terminal device based on the reference signal. Therefore, the $N_T \times N_{SB}$-dimensional matrix obtained by converting the measured value y''' is a precoding matrix that is determined by the network device based on the CSI and that corresponds to one receive antenna or one layer.

If the network device determines the measured value in the form 2, the network device may obtain, based on each group of indication information in the received CSI, a measured value Y''' corresponding to one receive antenna or one layer. A dimension of the measured value may be $N_T \times N_{SB}$. The measured value Y''' determined by the network device based on the CSI may be the same as or close to the measured value Y'' obtained by the terminal device through processing based on the precoding matrix. Because the measured value Y''' is determined based on a feedback provided by the terminal device based on the matrix $U_{P,T}''$, and the matrix $U_{P,T}''$ approaches the precoding matrix $V_r$. Therefore, the measured value is the same as or close to the precoding matrix $V_r$ obtained by the terminal device based on the reference signal. In other words, the measured value is a precoding matrix that is determined by the network device based on the CSI and that corresponds to one receive antenna or one layer.

Further, the network device may obtain a measured value Z' by traversing a value of n in $[1, N_R]$. A dimension of the measured value Z' may be $(N_T \cdot N_{SB}) \times N_R$. $N_R N_T \times N_{SB}$-dimensional matrices may be obtained by performing the foregoing operations on each column in the measured value Z'. When a quantity of rows remains unchanged, an $N_T \times (N_R \cdot N_{SB})$-dimensional matrix may be obtained by sequentially concatenating the $N_R$ $N_T \times N_{SB}$-dimensional matrices. The $N_T \times (N_R \cdot N_{SB})$-dimensional matrix may be understood as a precoding matrix corresponding to one antenna port group.

Further, if a plurality of antenna port groups are considered, for example, a quantity of antenna port groups is p, the terminal device and the network device may separately perform the foregoing operations on each antenna port group, to obtain p $N_T \times (N_R \cdot N_{SB})$-dimensional matrices. Then, on a premise that a quantity of columns remains unchanged, the obtained p $N_T \times (N_R \cdot N_{SB})$-dimensional matrices are sequentially concatenated to obtain a $(p \cdot N_T) \times (N_R \cdot N_{SB})$-dimensional matrix. The $(p \cdot N_T) \times (N_R \cdot N_{SB})$-dimensional matrix is a precoding matrix corresponding to the p antenna port groups.

According to the foregoing technical solution, the terminal device may process the channel matrix or the precoding matrix based on the first group of base vectors and the second group of base vectors, and feed back the processed result to the network device by using the CSI. The network device may determine the measured value based on the CSI, to further determine the precoding matrix. The terminal device may obtain the to-be-fed-back CSI through fast computation of the FFT and the IFFT. However, in a prior-art process, a terminal device traverses all codewords in a codebook to determine a precoding matrix. Therefore, complexity of calculation by the terminal device may be significantly reduced. This helps reduce power consumption of the terminal device. In addition, the CSI is fed back, so that the network device determines the proper precoding matrix to precode the to-be-sent signal. This improves data transmission reliability. In other words, the data transmission reliability is ensured, channel measurement complexity is significantly reduced, and power consumption is reduced. Therefore, this helps improve performance of an entire communications system.

D: Manner 4

In the manner 1 to the manner 3 listed above, the terminal device may learn of the first group of base vectors and the second group of base vectors in advance, and further determine the M beam vectors based on the first group of base vectors and the second group of base vectors. This should not constitute any limitation on this application. Alternatively, the terminal device may not learn of the first group of base vectors and the second group of base vectors in advance, and perform CSI measurement and feedback based on a pre-stored set (namely, a first set) of a plurality of groups of base vectors and a pre-stored set (namely, a second set) of a plurality of groups of base vectors.

The first set may include $K_1$ (where $K_1 \geq 1$, and $K_1$ is a positive integer) groups of base vectors, and be denoted as, for example, $G_{1,a}$, where $1 \leq a \leq K_1$. Each group of base vectors in the first set may be an IDFT vector, or a Kronecker product of two IDFT vectors. Optionally, each group of base vectors in the first set includes a plurality of column vectors, and each of the plurality of column vectors may be any one of (a) to (i) listed in step 220. For brevity, details are not described herein again.

The second set may include $K_2$ (where $K_2 \geq 1$, and $K_2$ is a positive integer) groups of base vectors, and be denoted as, for example, $G_{2,c}$, where $1 \leq c \leq K_2$. Each group of base vectors in the second set may be a DFT vector.

In this embodiment of this application, a dimension of each group of base vectors in the first set may be $N_T \times N_1$, and a dimension of each group of base vectors in the second set may be $N_{SB} \times N_2$.

In the manner 4, step (1) to step (4) may be included. Step (1) to step (3) may be operations performed by the terminal device, and step (4) may be an operation performed by the network device. In addition, step (3) and step (4) may be performed with reference to any one of the manner 1 to the manner 3.

Step (1):

The terminal device may traverse the groups of base vectors in the first set and the groups of base vectors in the second set, and feed back a selected first group of base vectors and second group of base vectors to the network device.

Specifically, the terminal device may sequentially traverse a value of a in [1, $K_1$], and traverse a value of c in [1, $K_2$]; and for each value of a and each value of c, perform IDFT and DFT on the precoding matrix V based on a group $G_{1,a}$ of base vectors in the first set and a group $G_{2,c}$ of base vectors in the second set, for example, $G_{1,a} * V (G_{2,c}*)^T$, to obtain an $N_1 \times N_2$-dimensional matrix.

By traversing the value of a in [1, $K_1$] and traversing the value of c in [1, $K_2$], the terminal device may obtain $K_1 \times K_2$ $N_1 \times N_2$-dimensional matrices.

It should be understood that a specific process in which the terminal device performs IDFT and DFT on the precoding matrix is similar to specific processes in step (i) and step (ii) in the manner 1. For brevity, details are not described herein again.

Step (2):

The terminal device determines, in the K, $K_1 \times K_2$ $N_1 \times N_2$-dimensional matrices, a matrix having a highest power value.

In a possible implementation, the terminal device calculates a sum of powers of $N_1 \times N_2$ elements included in each of the $K_1 \times K_2$ matrices, to obtain $K_1 \times K_2$ power sums corresponding to the $K_1 \times K_2$ matrices, and determines the highest value in the $K_1 \times K_2$ power sums. The terminal device may determine a group of base vectors that is in the first set and used by the matrix corresponding to the highest value as a first group of base vectors, and determine a group of base vectors that is in the second set and used by the matrix corresponding to the highest value as a second group of base vectors.

The terminal device may feed back an index of the first group of base vectors in the first set and an index of the second group of base vectors in the second set to the network device.

A dimension of the first group of base vectors fed back by the terminal device may be $N_T \times M_B$, and a dimension of the second group of base vectors fed back by the terminal device may be $N_{SB} \times M_T$.

Step (3):

The terminal device may project the precoding matrix based on the first group of base vectors and the second group of base vectors that are determined in step 1) and step 2), determine M amplitude coefficients corresponding to the M beams and M phase coefficients corresponding to the M beams, and send the CSI.

Because the M beams have been determined in step (1) and step (2), a specific process in which the terminal device may further determine the M amplitude coefficients corresponding to the M beams and the M phase coefficients corresponding to the M beams, and send the CSI may be implemented in any one of the manner 1 to the manner 3. Specifically, the terminal device may determine and send the CSI by performing step (i) to step (v) in the manner 1, step (i) to step (v) in the manner 2, or step (i) to step (v) in the manner 3. For brevity, details are not described herein again.

Step (4):

The network device may determine the precoding matrix based on the received CSI.

A specific process in which the network device determines the precoding matrix based on the received CSI may be implemented in any one of the manner 1 to the manner 3. Specifically, the network device may determine the measured value by performing step (vi) and step (vii) in the manner 1, step (vi) to step (vx) in the manner 2, or step (vi) in the manner 3. For brevity, details are not described herein again.

In the foregoing three manners, the terminal device may indicate the measured value set to the network device by using the CSI, and the network device may determine the measured value set based on the CSI, to determine the precoding matrix.

According to the foregoing technical solution, the terminal device may process the channel matrix or the precoding matrix based on the first group of base vectors and the second group of base vectors, and feed back the processed result to the network device by using the CSI. The network device may determine the measured value based on the CSI, to further determine the precoding matrix. The terminal device may obtain the to-be-fed-back CSI through fast computation of the FFT and the IFFT. However, in a prior-art process, a terminal device traverses all codewords in a codebook to determine a precoding matrix. Therefore, complexity of calculation by the terminal device may be significantly reduced. This helps reduce power consumption of the terminal device. In addition, the CSI is fed back, so that the network device determines the proper precoding matrix to precode the to-be-sent signal. This improves data transmission reliability. In other words, the data transmission reliability is ensured, channel measurement complexity is significantly reduced, and power consumption is reduced. Therefore, this helps improve performance of an entire communications system.

It should be noted that, merely for ease of understanding, the manner 4 shows a specific process in which the terminal device feeds back the first group of base vectors and the second group of base vectors. This should not constitute any limitation on this application. The terminal device may indicate only one of the first group of base vectors and the second group of base vectors, and the other group is indicated by the network device or pre-defined. A group of base vectors (for example, the first group of base vectors) fed back by the terminal device may be the first group of base vectors determined through traversal of the first set. The first group of base vectors may include $M_B$ selected $N_T \times 1$-dimensional column vectors. The second group of base vectors may be pre-defined or indicated by the network device, and may include $N_2$ $N_{SB} \times 1$-dimensional column vectors. The terminal device may further select $M_T$ column vectors from the second group of base vectors and feed back the $M_T$ column vectors.

It should be understood that the method for obtaining the precoding matrix through SVD decomposition is not limited to the foregoing descriptions. The terminal device may alternatively perform SVD decomposition on the channel matrix corresponding to each frequency unit to obtain the precoding matrix. A dimension of the obtained precoding matrix may be $N_T \times N_R$. A transformation process of the precoding matrix and a CSI feedback process are similar to the specific processes described above. For brevity, details are not described herein again.

2. The Channel Matrix is Used as the to-be-Transformed Object:

A specific implementation process of using the channel matrix as the to-be-transformed object is basically similar to a specific implementation process of using the precoding matrix as the to-be-transformed object, and a difference lies in that an SVD operation performed based on the channel matrix may be performed by the network device. To be specific, the terminal device may directly use the channel matrix as the to-be-transformed object, and feed back the CSI in any one of the manner 1 to the manner 4 listed above; the network device may obtain the measured value based on the CSI in a manner corresponding to the terminal device, and further determine the channel matrix based on the measured value. The network device may further perform SVD on the channel matrix obtained through conversion, to obtain the precoding matrix.

A specific process of performing operations by the terminal device and the network device based on any one of the manner 1 to the manner 4 listed above has been described in detail above. For brevity, details are not described herein again.

It should be understood that the foregoing method for obtaining the precoding matrix by performing SVD on the channel matrix is merely an example for description, and should not constitute any limitation on this application. The method for determining the precoding matrix based on the channel matrix may be implemented by using a method in the prior art. This is not limited in this application.

Therefore, according to the foregoing technical solution, the terminal device may process the channel matrix or the precoding matrix based on the first group of base vectors and the second group of base vectors, and feed back the processed result to the network device by using the CSI. The network device may determine the measured value based on the CSI, to further determine the precoding matrix. The terminal device may obtain the to-be-fed-back CSI through fast computation of the FFT and the IFFT. However, in a prior-art process, a terminal device traverses all codewords in a codebook to determine a precoding matrix. Therefore, complexity of calculation by the terminal device may be significantly reduced. This helps reduce power consumption of the terminal device. In addition, the CSI is fed back, so that the network device determines the proper precoding matrix to precode the to-be-sent signal. This improves data transmission reliability, and helps improve performance of the entire communications system.

It should be understood that, merely for ease of understanding, the foregoing lists several possible implementations in which the measured value is related to the first group of base vectors and the second group of base vectors, or related to the Kronecker product of the first group of base vectors and the second group of base vectors. The possible implementations are merely examples for description, and should not constitute any limitation on this application. This application does not exclude a possibility of using another method for implementation.

It should be further understood that, merely for ease of understanding, in the foregoing descriptions, a downlink channel measurement and feedback process between the network device and the terminal device is used as an example to describe the embodiments of this application in detail. This should not constitute any limitation on this application. The method provided in the embodiments of this application is also applicable to uplink channel measurement and feedback. In an uplink channel measurement process, the terminal device may send a reference signal used for uplink channel measurement, for example, an SRS. It should be understood that the SRS, as the reference signal used for uplink channel measurement, is merely an example for description, and should not constitute any limitation on this application. This application does not exclude a possibility of defining another reference signal such as an uplink DMRS in a future protocol to implement a same or similar function. A specific implementation method and process of the uplink channel measurement and feedback are similar to a specific implementation method and process of the downlink channel measurement and feedback. For brevity, detailed description of the specific process is omitted herein.

The foregoing describes in detail the communication method provided in the embodiments of this application with reference to FIG. 2 and FIG. 3. The following describes in detail a communications apparatus provided in the embodiments of this application with reference to FIG. 4 to FIG. 6.

Figure 4:
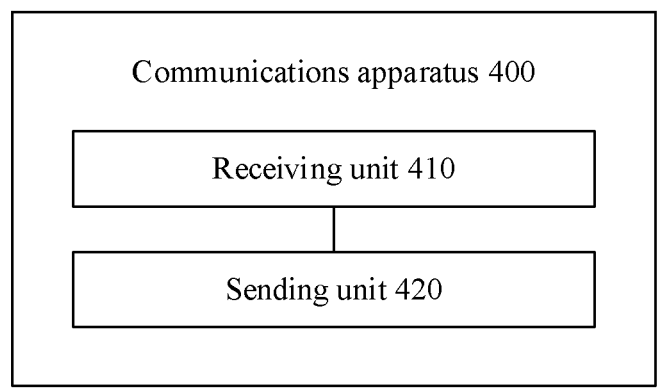
FIG. 4 is a schematic block diagram of a communications apparatus according to an embodiment of this application.

FIG. 4 is a schematic block diagram of a communications apparatus 400 according to an embodiment of this application. The communications apparatus 400 may be applied to the communications system shown in FIG. 1. As shown in FIG. 4, the communications apparatus 400 includes a receiving unit 410 and a sending unit 420.

In a possible design, the communications apparatus 400 may be a terminal device or a chip configured in a terminal device.

The receiving unit 410 may be configured to receive a reference signal, where the reference signal is used for channel measurement.

The sending unit 420 may be configured to send channel state information CSI, where the CSI is used to indicate a measured value set, the measured value set is used to determine a precoding matrix, or the measured value set is the precoding matrix, and the measured value set includes one or more measured values; the measured value is related to a first group of base vectors and a second group of base vectors, or the measured value is related to a Kronecker product of the first group of base vectors and the second group of base vectors. The first group of base vectors includes a DFT vector or a Kronecker product of two DFT vectors, and second group of base vectors includes an IDFT vector.

Optionally, the receiving unit 410 is further configured to receive configuration information of one or more of the following:

the first group of base vectors, the second group of base vectors, or the Kronecker product of the first group of base vectors and the second group of base vectors.

Optionally, the sending unit 420 is further configured to send configuration information of one or more of the following:

the first group of base vectors, the second group of base vectors, or the Kronecker product of the first group of base vectors and the second group of base vectors.

Optionally, the first group of base vectors is defined in a protocol; or the second group of base vectors is defined in a protocol; or the first group of base vectors and the second group of base vectors are defined in a protocol; or the Kronecker product of the first group of base vectors and the second group of base vectors is defined in a protocol.

Optionally, the measured value includes R columns, and an $n^{th}$ column $y^n$ in the R columns meets $$y^n = \alpha \sum_{i=1}^{M} B_i^n P_i^n C_i^n,$$

where

α is a normalized coefficient; M is a quantity of base vectors, and the M base vectors are M columns in the Kronecker product of the first group of base vectors and the second group of base vectors; $B_i^n$ is an $i^{th}$ column vector in the M base vectors corresponding to the $n^{th}$ column, and a dimension of $B_i^n$ is $N_T \cdot N_{SB} \times 1$; $P_i^n C_i^n$ is a linear superposition coefficient of $B_i^n$; $P_i^n$ is an amplitude coefficient of $B_i^n$; $C_i^n$ is a phase coefficient of $B_i^n$; $N_T$ is a quantity of transmit antenna ports of the reference signal, $N_{SB}$ is a quantity of frequency domain units included in a frequency domain resource for transmitting the reference signal, and R is determined based on a quantity of receive antenna ports of the reference signal or a rank of a channel matrix, where $1 \le i \le M$, $1 \le n \le R$, and i, n, M, and R are all integers.

Optionally, the CSI is used to indicate one or more of the following:

M base vectors corresponding to an $r^{th}$ column of the R columns, M amplitude coefficients corresponding to the M base vectors, or M phase coefficients corresponding to the M base vectors, where a value of r is traversed in [1, R], and r is an integer.

Optionally, the CSI includes one or more of the following:

indication information of M base vectors corresponding to an $r^{th}$ column of the R columns, indication information of M amplitude coefficients corresponding to the M base vectors, or indication information of M phase coefficients corresponding to the M base vectors, where a value of r is traversed in [1, R], and r is an integer.

Optionally, the indication information of the M base vectors corresponding to the $r^{th}$ column includes a position, in a preconfigured matrix, of each of the M base vectors corresponding to the $r^{th}$ column, and the preconfigured matrix is the Kronecker product of the first group of base vectors and the second group of base vectors.

Optionally, the indication information of the M base vectors corresponding to the $r^{th}$ column includes a position, in the first group of base vectors, of each of the M column vectors corresponding to the $r^{th}$ column, and a position of the column vector in the second group of base vectors.

Optionally, a value of M is indicated by a network device, or is defined in a protocol.

Optionally, the measured value includes R matrices, and an $n^{th}$ matrix $Y^n$ of the R matrices meets:

$$Y^n = \beta \sum_{b=1}^{M_B} \sum_{t=1}^{M_T} E_b^n (F_t^n)^T P_{b,t}^n C_{b,t}^n,$$

where β is a normalized coefficient; $M_B$ is a quantity of first base vectors, $M_T$ is a quantity of second base vectors, the $M_B$ first base vectors are $M_B$ columns in the first group of base vectors, and the $M_T$ second base vectors are $M_T$ columns in the second group of base vectors; $E_b^n$ is a $b^{th}$ first base vector in the $M_B$ first base vectors corresponding to the $n^{th}$ matrix, and a dimension of $E_b^n$ is $N_T \times 1$; $F_t^n$ is a $t^{th}$ second base vector in the $M_T$ second base vectors corresponding to the $n^{th}$ matrix, and a dimension of $F_t^n$ is $N_{SB} \times 1$; $P_{b,t}^n C_{b,t}^n$ is a linear superposition coefficient; $P_{b,t}^n$ is an amplitude coefficient; $C_{b,t}^n$ is a phase coefficient, where $1 \le b \le M_B$, $1 \le t \le M_T$, and b, t, $M_B$, and $M_T$ are all integers.

Optionally, the CSI includes one or more of the following:

indication information of the $M_B$ first column vectors, indication information of the $M_T$ second column vectors, indication information of $M_B \cdot M_T$ amplitude coefficients corresponding to the $M_B$ first column vectors and the $M_T$ second column vectors, or indication information of $M_B \cdot M_T$ phase coefficients corresponding to the $M_B$ first column vectors and the $M_T$ second column vectors, where the indication information of the $M_B$ first column vectors includes a position, in the first group of column vectors, of each of the $M_B$ first column vectors, and the indication information of the $M_T$ second column vectors includes a position, in the second group of column vectors, of each of the $M_T$ second column vectors.

Optionally, a value of $M_B$ is indicated by the network device, or is defined in a protocol; and a value of $M_T$ is indicated by the network device, or is defined in the protocol.

Optionally, the measured value corresponds to one of a plurality of antenna port groups for sending the reference signal.

It should be understood that the communications apparatus 400 may correspond to the terminal device in the communication method 200 in the embodiments of the present invention, and the communications apparatus 400 may include modules configured to perform the method performed by the terminal device in the communication method 200 in FIG. 2. In addition, the modules in the communications apparatus 400 and the foregoing other operations and/or functions are respectively intended to implement corresponding procedures of the communication method 200 in FIG. 2. Specifically, the receiving unit 410 is configured to perform step 210 and step 230 in the method 200, and the sending unit 420 is configured to perform step 220 in the method 200. A specific process of performing the foregoing corresponding step by each module has been described in detail in the method 200. For brevity, details are not described herein again.

In another possible design, the communications apparatus 400 may be a network device or a chip configured in a network device.

The sending unit 420 may be configured to send a reference signal, where the reference signal is used for channel measurement.

The receiving unit 410 may be configured to receive channel state information CSI, where the CSI is used to indicate a measured value set, the measured value set is used to determine a precoding matrix, or the measured value set is the precoding matrix, and the measured value set includes one or more measured values; the measured value is related to a first group of base vectors and a second group of base vectors, or the measured value is related to a Kronecker product of the first group of base vectors and the second group of base vectors, the first group of base vectors include an inverse discrete Fourier transform IDFT vector or a Kronecker product of two IDFT vectors, and the second group of base vectors include a discrete Fourier transform DFT vector.

The sending unit 420 may further be configured to: precode a signal based on the precoding matrix determined based on the measured value set, and send a precoded signal.

Optionally, the sending unit 420 is further configured to send configuration information of one or more of the following:

the first group of base vectors, the second group of base vectors, or the Kronecker product of the first group of base vectors and the second group of base vectors.

Optionally, the receiving unit 410 is further configured to receive configuration information of one or more of the following:

the first group of base vectors, the second group of base vectors, or the Kronecker product of the first group of base vectors and the second group of base vectors.

Optionally, the first group of base vectors is defined in a protocol; or the second group of base vectors is defined in a protocol; or the first group of base vectors and the second group of base vectors are defined in a protocol; or the Kronecker product of the first group of base vectors and the second group of base vectors is defined in a protocol.

Optionally, the measured value includes R columns, and an $n^{th}$ column $y^n$ in the R columns meets $$y^n = \alpha \sum_{i=1}^{M} B_i^n P_i^n C_i^n,$$

where $\alpha$ is a normalized coefficient; M is a quantity of base vectors, and the M base vectors are M columns in the Kronecker product of the first group of base vectors and the second group of base vectors; $B_i^n$ is an $i^{th}$ column vector in the M base vectors corresponding to the $n^{th}$ column, and a dimension of $B_i^n$ is $N_T \cdot N_{SB} \times 1$; $P_i^n C_i^n$ is a linear superposition coefficient of $B_i^n$; $P_i^n$ is an amplitude coefficient of $B_i^n$; $C_i^n$ is a phase coefficient of $B_i^n$; $N_T$ is a quantity of transmit antenna ports of the reference signal, $N_{SB}$ is a quantity of frequency domain units included in a frequency domain resource for transmitting the reference signal, and R is determined based on a quantity of receive antenna ports of the reference signal or a rank of a channel matrix, where $1 \le i \le M$, $1 \le n \le R$, and i, n, M, and R are all integers.

Optionally, the CSI is used to indicate one or more of the following:

M base vectors corresponding to an $r^{th}$ column of the R columns, M amplitude coefficients corresponding to the M base vectors, or M phase coefficients corresponding to the M base vectors, where a value of r is traversed in [1, R], and r is an integer.

Optionally, the CSI includes one or more of the following:

indication information of M base vectors corresponding to an $r^{th}$ column of the R columns, indication information of M amplitude coefficients corresponding to the M base vectors, or indication information of M phase coefficients corresponding to the M base vectors, where a value of r is traversed in [1, R], and r is an integer.

Optionally, the indication information of the M base vectors corresponding to the $r^{th}$ column includes a position, in a preconfigured matrix, of each of the M base vectors corresponding to the $r^{th}$ column, and the preconfigured matrix is the Kronecker product of the first group of base vectors and the second group of base vectors.

Optionally, the indication information of the M base vectors corresponding to the $r^{th}$ column includes a position, in the first group of base vectors, of each of the M column vectors corresponding to the $r^{th}$ column, and a position of the column vector in the second group of base vectors.

Optionally, a value of M is indicated by a network device, or is defined in a protocol.

Optionally, the measured value includes R matrices, and an $n^{th}$ matrix $Y^n$ of the R matrices meets:

$$Y^n = \beta \sum_{b=1}^{M_B} \sum_{t=1}^{M_T} E_b^n (F_t^n)^T P_{b,t}^n C_{b,t}^n,$$

where $\beta$ is a normalized coefficient; $M_B$ is a quantity of first base vectors, $M_T$ is a quantity of second base vectors, the $M_B$ first base vectors are $M_B$ columns in the first group of base vectors, and the $M_T$ second base vectors are $M_T$ columns in the second group of base vectors; $E_b^n$ is a $b^{th}$ first base vector in the $M_B$ first base vectors corresponding to the $n^{th}$ matrix, and a dimension of $E_b^n$ is $N_T \times 1$; $F_t^n$ is a $t^{th}$ second base vector in the $M_T$ second base vectors corresponding to the nth matrix, and a dimension of $F_t^n$ is $N_{SB} \times 1$; $P_{b,t}^n C_{b,t}^n$ is a linear superposition coefficient; $P_{b,t}^n$ is an amplitude coefficient; $C_{b,t}^n$ is a phase coefficient, where $1 \leq b \leq M_B$, $1 \leq t \leq M_T$, $1 \leq n \leq R$, and b, t, n, R, $M_B$, and $M_T$ are all integers.

Optionally, the CSI includes one or more of the following:
indication information of the $M_B$ first column vectors, indication information of the $M_T$ second column vectors, indication information of $M_B \cdot M_T$ amplitude coefficients corresponding to the $M_B$ first column vectors and the $M_T$ second column vectors, or indication information of $M_B \cdot M_T$ phase coefficients corresponding to the $M_B$ first column vectors and the $M_T$ second column vectors, where the indication information of the $M_B$ first column vectors includes a position, in the first group of column vectors, of each of the $M_B$ first column vectors, and the indication information of the $M_T$ second column vectors includes a position, in the second group of column vectors, of each of the $M_T$ second column vectors.

Optionally, a value of $M_B$ is indicated by the network device, or is defined in a protocol; and a value of $M_T$ is indicated by the network device, or is defined in the protocol.

Optionally, the measured value corresponds to one of a plurality of antenna port groups for sending the reference signal.

It should be understood that the communications apparatus 400 may correspond to the network device in the communication method 200 in the embodiments of the present invention, and the communications apparatus 400 may include modules configured to perform the method performed by the network device in the communication method 200 in FIG. 2. In addition, the modules in the communications apparatus 400 and the foregoing other operations and/or functions are respectively intended to implement corresponding procedures of the communication method 200 in FIG. 2. Specifically, the sending unit 420 may be configured to perform step 210 and step 230 in the method 200, and the receiving unit 410 may be configured to perform step 220 in the method 200. A specific process of performing the foregoing corresponding step by each unit has been described in detail in the method 200. For brevity, details are not described herein again.

Figure 5:
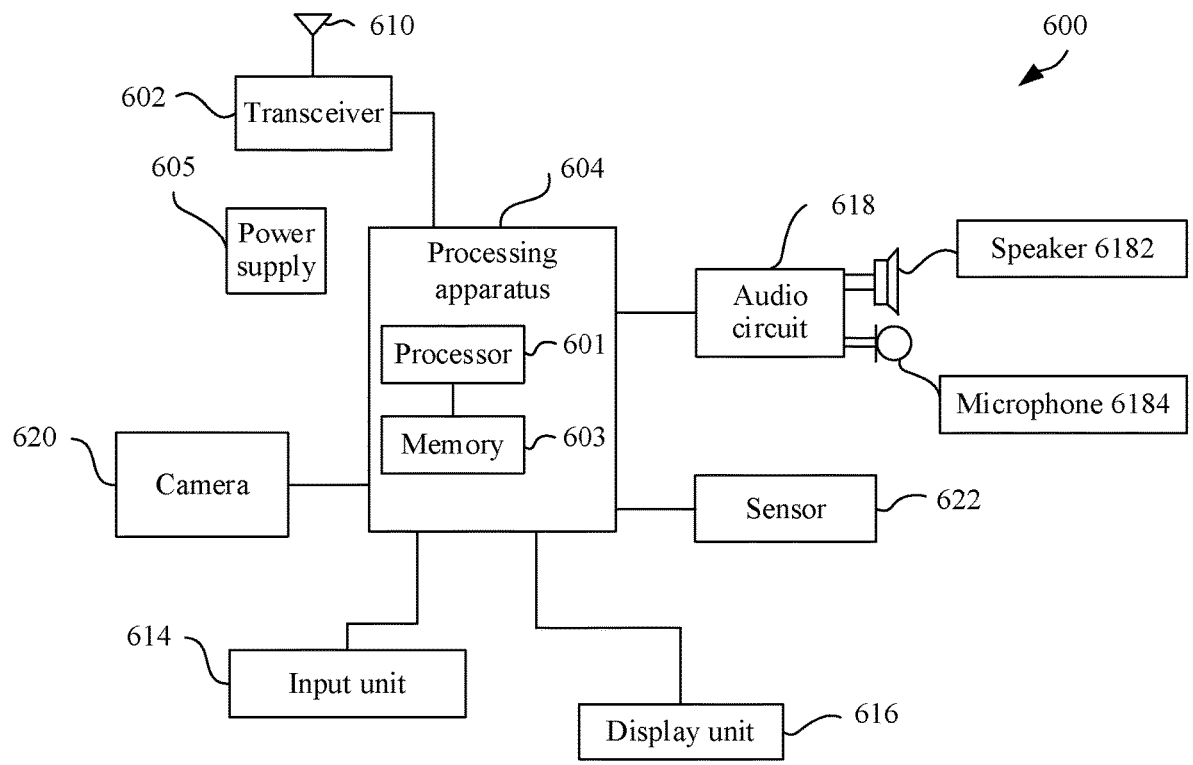
FIG. 5 is a schematic structural diagram of a terminal device according to an embodiment of this application.

FIG. 5 is a schematic structural diagram of a terminal device 600 according to an embodiment of this application. As shown in FIG. 5, the terminal device 600 includes a processor 601 and a transceiver 602. Optionally, the terminal device 600 further includes a memory 603. The processor 602, the transceiver 602, and the memory 603 communicate with each other by using an internal connection path, to transfer a control signal and/or a data signal. The memory 603 is configured to store a computer program. The processor 601 is configured to: invoke the computer program from the memory 603 and run the computer program, to control the transceiver 602 to send/receive a signal.

The processor 601 and the memory 603 may be integrated into one processing apparatus 604, and the processor 601 is configured to execute program code stored in the memory 603, to implement the foregoing function. During specific implementation, the memory 603 may alternatively be integrated into the processor 601, or may be independent of the processor 601. The terminal device 600 may further include an antenna 610, configured to send, by using a radio signal, uplink data or uplink control signaling output by the transceiver 602.

Specifically, the terminal device 600 may correspond to the terminal device in the communication method 200 in the embodiments of this application, and the terminal device 600 may include modules configured to perform the method performed by the terminal device in the communication method 200 in FIG. 2. In addition, the modules in the terminal device 600 and the foregoing other operations and/or functions are respectively intended to implement corresponding procedures of the communication method 200 in FIG. 2. Specifically, the memory 603 is configured to store program code, so that when executing the program code, the processor 601 controls the transceiver 602 to perform step 210 to step 230 in the method 200. A specific process in which each module performs the foregoing corresponding step has been described in detail in the method 200. For brevity, details are not described herein again.

The processor 601 may be configured to perform an action internally implemented by the terminal in the foregoing method embodiments, and the transceiver 602 may be configured to perform a transmitting action or a sending action by the terminal for the network device in the foregoing method embodiments. For details, refer to the descriptions in the foregoing method embodiments. Details are not described herein again.

The processor 601 and the memory 603 may be integrated into one processing apparatus, and the processor 601 is configured to execute program code stored in the memory 603, to implement the foregoing function. During specific implementation, the memory 603 may alternatively be integrated into the processor 601.

The terminal device 600 may further include a power supply 605, configured to supply power to various components or circuits in the terminal.

In addition, to make functions of the terminal device more perfect, the terminal device 600 may further include one or more of an input unit 614, a display unit 616, an audio circuit 618, a camera 620, a sensor 622, and the like, and the audio circuit may further include a speaker 6182, a microphone 6184, and the like.

Figure 6:
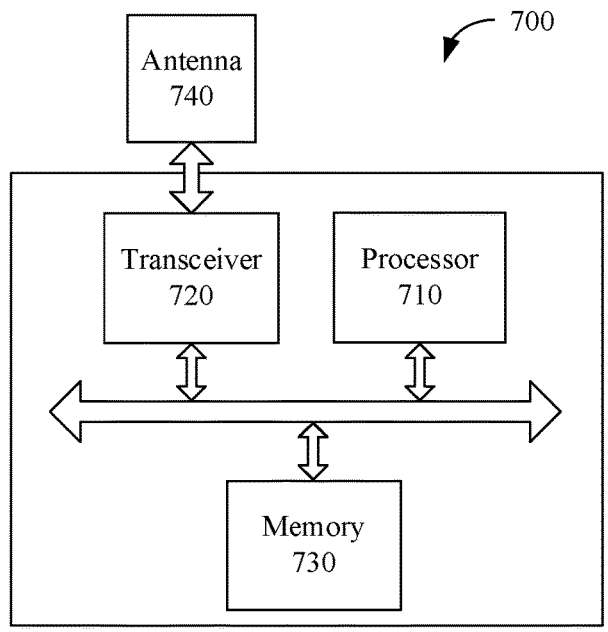
FIG. 6 is a schematic structural diagram of a network device according to an embodiment of this application.

FIG. 6 is a schematic structural diagram of a network device 700 according to an embodiment of this application. As shown in FIG. 6, the network device 700 includes a transceiver a processor 710 and a transceiver 720. Optionally, the network device 700 further includes a memory 730. The processor 710, the transceiver 720, and the memory 730 communicate with each other by using an internal connection path, to transfer a control signal and/or a data signal. The memory 730 is configured to store a computer program. The processor 710 is configured to: invoke the computer program from the memory 730 and run the computer program, to control the transceiver 720 to send/receive a signal.

The processor 710 and the memory 730 may be integrated into one processing apparatus, and the processor 710 is configured to execute program code stored in the memory 730, to implement the foregoing function. During specific implementation, the memory 730 may alternatively be integrated into the processor 710, or may be independent of the processor 710.

The network device may further include an antenna 740, configured to send, by using a radio signal, downlink data or downlink control signaling output by the transceiver 720.

Specifically, the network device 700 may correspond to the network device in the communication method 200 in the embodiments of this application, and the network device 700 may include modules configured to perform the method performed by the network device in the communication method 200 in FIG. 2. In addition, the modules in the network device 700 and the foregoing other operations and/or functions are respectively intended to implement corresponding procedures of the communication method 200 in FIG. 2. Specifically, the memory 730 is configured to store program code, so that when executing the program code, the processor 710 controls the transceiver 720 to perform step 210 to step 230 in the method 200 by using the antenna 740. A specific process in which each module performs the foregoing corresponding step has been described in detail in the method 200. For brevity, details are not described herein again. It should be understood that, the processor in the embodiments of this application may be a central processing unit (CPU), or may be another general-purpose processor, a digital signal processor (DSP), an application-specific integrated circuit (ASIC), a field programmable gate array (FPGA), or another programmable logical device, a discrete gate or transistor logical device, a discrete hardware component, or the like. The general-purpose processor may be a microprocessor, or the processor may be any conventional processor or the like.

It should be further understood that the memory in the embodiments of this application may be a volatile memory or a nonvolatile memory, or may include both a volatile memory and a nonvolatile memory. The nonvolatile memory may be a read-only memory (ROM), a programmable read-only memory (programmable ROM, or PROM), an erasable programmable read-only memory (erasable PROM, or EPROM), an electrically erasable programmable read-only memory (electrically EPROM, or EEPROM), or a flash memory. The volatile memory may be a random access memory (RAM), used as an external cache. By way of example but not limitative description, many forms of random access memories may be used, for example, a static random access memory (SRAM), a dynamic random access memory (DRAM), a synchronous dynamic random access memory (synchronous DRAM, or SDRAM), a double data rate synchronous dynamic random access memory (double data rate SDRAM, or DDR SDRAM), an enhanced synchronous dynamic random access memory (enhanced SDRAM, or ESDRAM), a synchlink dynamic random access memory (synchlink DRAM, or SLDRAM), and a direct rambus dynamic random access memory (direct rambus RAM, or DR RAM).

According to the method provided in the embodiments of this application, this application further provides a computer program product, and the computer program product includes computer program code. When the computer program code is run on a computer, the computer is enabled to perform the method in the embodiment shown in FIG. 2.

According to the method provided in the embodiments of this application, this application further provides a computer-readable medium, and the computer-readable medium stores program code. When the program code is run on a computer, the computer is enabled to perform the method in the embodiment shown in FIG. 2.

According to the method provided in the embodiments of this application, this application further provides a system. The system includes the foregoing network device and one or more terminal devices.

All or some of the foregoing embodiments may be implemented by using software, hardware, firmware, or any combination thereof. When software is used to implement the embodiments, all or some of the foregoing embodiments may be implemented in a form of a computer program product. The computer program product includes one or more computer instructions. When the computer program instructions are loaded or executed on a computer, the procedure or functions according to the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases: only A exists, both A and B exist, and only B exists. In addition, the character "/" in this specification is usually a simplified form of "and/or".

It should be understood that sequence numbers of the foregoing processes do not mean execution sequences in various embodiments of this application. The execution sequences of the processes should be determined based on functions and internal logic of the processes, and should not constitute any limitation on the implementation processes of the embodiments of this application.

A person of ordinary skill in the art may be aware that, in combination with the units and algorithm steps in the examples described in the embodiments disclosed in this specification, this application may be implemented by using electronic hardware or a combination of electronic hardware and computer software. Whether the functions are performed by using hardware or software depends on particular applications and design constraint conditions of the technical solutions. A person skilled in the art may use a different method to implement the described functions for each particular application, but it should not be considered that the implementation goes beyond the scope of this application.

It may be clearly understood by a person skilled in the art that, for the purpose of convenient and brief description, for detailed working processes of the foregoing system, apparatus, and unit, refer to a corresponding processes in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the modules or units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, ROM, RAM) a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   receiving a reference signal from a network device, wherein the reference signal is used for channel measurement; and
   sending channel state information (CSI), wherein the CSI is used to indicate a preceding matrix;
   wherein the CSI comprises:
   indication information of $M_B$ first base vectors, indication information of $M_T$ second base vectors, indication information of $M_B \cdot M_T$ amplitude coefficients corresponding to the $M_B$ first base vectors and the $M_T$ second base vectors, and indication information of $M_B \cdot M_T$ phase coefficients corresponding to the $M_B$ first base vectors and the $M_T$ second base vectors, wherein $M_B$ is a quantity of the first base vectors, $M_T$ is a quantity of the second base vectors, the $M_B$ first base vectors are $M_B$ columns in a first group of base vectors, and the $M_T$ second base vectors are $M_T$ columns in a second group of base vectors, the indication information of the $M_B$ first base vectors comprises a position, in the first group of base vectors, of each of the $M_B$ first base vectors, and the indication information of the $M_T$ second base vectors comprises a position, in the second group of base vectors, of each of the $M_T$ second base vectors.

2. The method according to claim 1, wherein the method further comprises:
   receiving configuration information of at least one of:
   the first group of base vectors, the second group of base vectors.

3. The method according to claim 1, wherein the precoding matrix comprises R matrices, and an $n^{th}$ matrix in the R matrices satisfies $$\sum_{b=1}^{M_B} \sum_{t=1}^{M_T} E_b^n (F_t^n)^T P_{b,t}^n C_{b,t}^n,$$

wherein $E_b^n$ is a $b^{th}$ first base vector in the $M_B$ first base vectors corresponding to the $n^{th}$ matrix, and a dimension of $E_b^n$ is $N_T \times 1$; $F_t^n$ is a $t^{th}$ second base vector in the $M_T$ second base vectors corresponding to the $n^{th}$ matrix, and a dimension of $F_t^n$ is $N_{SB} \times 1$; $P_{b,t}^n C_{b,t}^n$ is a linear superposition coefficient; $P_{b,t}^n$ is an amplitude coefficient; $C_{b,t}^n$ phase coefficient, wherein $1 \le n \le R$, n, and R are integers.

4. A method, comprising:
   sending a reference signal to a terminal device, wherein the reference signal is used for channel measurement;
   receiving channel state information (CSI) from the terminal device, wherein the CSI is used to indicate a precoding matrix;
   wherein the CSI comprises:
   indication information of $M_B$ first base vectors, indication information of $M_T$ second base vectors, indication information of $M_B \cdot M_T$ amplitude coefficients corresponding to the $M_B$ first base vectors and the $M_T$ second base vectors, and indication information of $M_B \cdot M_T$ phase coefficients corresponding to the $M_B$ first base vectors and the $M_T$ second base vectors, wherein $M_B$ is a quantity of the first base vectors, $M_T$ is a quantity of the second base vectors, the $M_B$ first base vectors are $M_B$ columns in a first group of base vectors, and the $M_T$ second base vectors are $M_T$ columns in a second group of base vectors, the indication information of the $M_B$ first base vectors comprises a position, in the first group of base vectors, of each of the $M_B$ first base vectors, and the indication information of the $M_T$ second base vectors comprises a position, in the second group of base vectors, of each of the $M_T$ second base vectors; and
   precoding a signal based on the precoding matrix determined based on the received CSI.

5. The method according to claim 4, wherein the method further comprises:
   sending configuration information of at least one of:
   the first group of base vectors, the second group of base vectors.

6. The method according to claim 4, wherein the precoding matrix comprises R matrices, and an $n^{th}$ matrix in the R matrices satisfies $$\sum_{b=1}^{M_B}\sum_{t=1}^{M_T} E_b^n (F_t^n)^T P_{b,t}^n C_{b,t}^n,$$

wherein $E_b^n$ is a $b^{th}$ first base vector in the $M_B$ first base vectors corresponding to the $n^{th}$ matrix, and a dimension of $E_b^n$ is $N_T \times 1$; $F_t^n$ is a $t^{th}$ second base vector in the $M_T$ second base vectors corresponding to the $n^{th}$ matrix and a dimension of is $F_t^n$ is $N_{SB} \times 1$; $P_{b,t}^n C_{b,t}^n$ is a linear superposition coefficient; $P_{b,t}^n$ is an amplitude coefficient; $C_{b,t}^n$ is a phase coefficient, wherein $1 \leq n \leq R$, n, and R are integers.

7. An apparatus, comprising:
a processor;
a computer readable storage medium storing programming for execution by the processor, the programming including instructions to carry the steps comprising:
receiving a reference signal from a network device, wherein the reference signal is used for channel measurement; and
sending channel state information (CSI), wherein the CSI is used to indicate a precoding matrix;
wherein the CSI comprises:
indication information of $M_B$ first base vectors, indication information of $M_T$ second base vectors, indication information of $M_B \cdot M_T$ amplitude coefficients corresponding to the $M_B$ first base vectors and the $M_T$ second base vectors, and indication information of $M_B \cdot M_T$ phase coefficients corresponding to the $M_B$ first base vectors and the $M_T$ second base vectors, wherein
$M_B$ is a quantity of the first base vectors, $M_T$ is a quantity of the second base vectors, the $M_B$ first base vectors are $M_B$ columns in a first group of base vectors, and the $M_T$ second base vectors are $M_T$ columns in a second group of base vectors, the indication information of the $M_B$ first base vectors comprises a position in the first group of base vectors, of each of the $M_B$ first base vectors, and the indication information of the $M_T$ second base vectors comprises a position, in the second group of base vectors, of each of the $M_T$ second base vectors.

8. The apparatus according to claim 7, wherein the programming stored on the computer readable storage medium further comprises the steps:
receiving configuration information of at least one of:
the first group of base vectors, the second group of base vectors.

9. The apparatus according to claim 7, wherein the precoding matrix comprises R matrices, and an $n^{th}$ matrix column y" in the R matrices satisfies $$\sum_{b=1}^{M_B}\sum_{t=1}^{M_T} E_b^n (F_t^n)^T P_{b,t}^n C_{b,t}^n,$$

wherein $E_b^n$ is a $b^{th}$ first base vector in the $M_B$ first base vectors corresponding to the $n^{th}$ matrix, and a dimension of $E_b^n$ is $N_T \times 1$; $F_t^n$ is a $t^{th}$ second base vector in the $M_T$ second base vectors corresponding to the $n^{th}$ matrix, and a dimension of $F_t^n$ is $N_{SB} \times 1$; $P_{b,t}^n C_{b,t}^n$ is a linear superposition coefficient; $P_{b,t}^n$ is an amplitude coefficient; $C_{b,t}^n$ is a phase coefficient, wherein $1 \leq n \leq R$, n, and R are integers.

10. An apparatus, comprising:
a processor;
one or more antennas; and
a computer readable storage medium storing programming for execution by the processor, the programming including instructions to carry the steps comprising:
sending a reference signal to a terminal device, wherein the reference signal is used for channel measurement;
receiving channel state information (CSI) from the terminal device, wherein the CSI is used to indicate preceding matrix;
wherein the CSI comprises:
indication information of $M_B$ first base vectors, indication information of $M_T$ second base vectors, indication information of $M_B \cdot M_T$ amplitude coefficients corresponding to the $M_B$ first base vectors and the $M_T$ second base vectors, and indication information of $M_B \cdot M_T$ phase coefficients corresponding to the $M_B$ first base vectors and the $M_T$ second base vectors wherein
$M_B$ is a quantity of the first base vectors, $M_T$ is a quantity of the second base vectors, the $M_B$ first base vectors are $M_B$ columns in a first group of base vectors, and the $M_T$ second base vectors are $M_T$ columns in a second group of base vectors, the indication information of the $M_B$ first base vectors comprises a position in the first group of base vectors, of each of the $M_B$ first base vectors, and the indication information of the $M_T$ second base vectors comprises a position, in the second group of base vectors, of each of the My second base vectors; and
precoding a signal based on the precoding matrix determined based on the received CSI.

11. The apparatus according to claim 10, wherein the programming stored on the computer readable storage medium further comprises the steps:
receiving configuration information of at least one of:
the first group of base vectors, the second group of base vectors.

12. The apparatus according to claim 10, wherein the precoding matrix comprises R matrices, and an $n^{th}$ matrix in the R matrices satisfies $$\sum_{b=1}^{M_B}\sum_{t=1}^{M_T} E_b^n (F_t^n)^T P_{b,t}^n C_{b,t}^n,$$

wherein $E_b^n$ is a $b^{th}$ first base vector in the $M_B$ first base vectors corresponding to the $n^{th}$ matrix, and a dimension of $E_b^n$ is $N_T \times 1$; $F_t^n$ is a $t^{th}$ second base vector in the $M_T$ second base vectors corresponding to the $n^{th}$ matrix, and a dimension of $F_t^n$, is $N_{SB} \times 1$; $P_{b,t}^n C_{b,t}^n$ is a linear superposition coefficient; $P_{b,t}^n$ is an amplitude coefficient; $C_{b,t}^n$ is a phase coefficient, wherein $1 \leq n \leq R$, n, and R are integers.

13. The method according to claim 1, wherein a value of $M_B$ and a value of $M_T$ are indicated by the network device.

14. The method according to claim 1, wherein a value of $M_B$ and a value of $M_T$ defined in a protocol.

15. The method according to claim 4, further comprising sending a value of $M_B$ and a value of $M_T$ to the terminal device.

16. The method according to claim 4, wherein a value of $M_B$ and a value of $M_T$ defined in a protocol.

17. The apparatus according to claim 7, wherein a value of $M_B$ and a value of $M_T$ are indicated by the network device.

18. The apparatus according to claim 7, wherein a value of $M_B$ and a value of $M_T$ defined in a protocol.

19. The apparatus according to claim 10, wherein the steps further comprise sending a value of $M_B$ and a value of $M_T$ to the terminal device.

20. The apparatus according to claim 10, wherein a value of $M_B$ and a value of $M_T$ are indicated by the network device.

* * * * *